(12) United States Patent
Alley et al.

(10) Patent No.: US 12,497,159 B2
(45) Date of Patent: *Dec. 16, 2025

(54) FOLDABLE PROPELLER BLADE WITH LOCKING MECHANISM

(71) Applicant: Anduril Industries, Inc., Costa Mesa, CA (US)

(72) Inventors: Nicholas Robert Alley, Marietta, GA (US); Joshua Lemming Steele, Marietta, GA (US); Jesse Owen Williams, Marietta, GA (US); Daniel Kuehme, Marietta, GA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,023

(22) Filed: Apr. 16, 2024

(65) Prior Publication Data

US 2025/0206438 A1 Jun. 26, 2025

Related U.S. Application Data

(63) Continuation of application No. 17/472,388, filed on Sep. 10, 2021, now Pat. No. 11,958,588, which is a
(Continued)

(51) Int. Cl.
*B64C 11/28* (2006.01)
*B64C 39/02* (2023.01)
(Continued)

(52) U.S. Cl.
CPC ............ *B64C 11/28* (2013.01); *B64C 39/024* (2013.01); *B64U 10/25* (2023.01); *B64U 30/293* (2023.01); *B64U 50/13* (2023.01); *B64U 30/12* (2023.01)

(58) Field of Classification Search
CPC ......... B64C 11/28; B64C 39/02; B64U 50/13; B64U 30/16; B64U 30/293
See application file for complete search history.

(56) References Cited

U.S. PATENT DOCUMENTS

| 1,496,723 A | 6/1924 | Miller |
| 2,017,291 A | 10/1935 | Pfleger |

(Continued)

FOREIGN PATENT DOCUMENTS

| AU | 2016351357 A1 | 5/2018 |
| CA | 2793114 A1 | 6/2013 |

(Continued)

OTHER PUBLICATIONS

International Search Report and Written Opinion dated Apr. 26, 2018 cited in Application No. PCT/US18/24891, 7 pgs.
(Continued)

*Primary Examiner* — Christopher P Ellis
(74) *Attorney, Agent, or Firm* — Knobbe, Martens, Olson & Bear, LLP

(57) ABSTRACT

An unmanned aerial vehicle with deployable components (UAVDC) may comprise a foldable propeller blade with a locking mechanism. Foldable propeller blades may have a stowed configuration and a deployed configuration relative to the UAVDC, and the foldable propeller blades may pivot about a hinge to move between configurations. In the deployed configuration, the foldable propellor may experience forward folding forces acting upon it. The locking mechanism may lock the foldable propeller blade in the deployed configuration. The locking mechanism may keep the foldable propeller locked into place to prevent forward folding tendency.

20 Claims, 31 Drawing Sheets

Related U.S. Application Data continuation of application No. 15/471,877, filed on Mar. 28, 2017, now Pat. No. 11,117,649, which is a continuation-in-part of application No. 15/388,478, filed on Dec. 22, 2016, now Pat. No. 9,902,487, which is a continuation-in-part of application No. 15/388,433, filed on Dec. 22, 2016, now Pat. No. 10,494,081, which is a continuation-in-part of application No. 15/388,396, filed on Dec. 22, 2016, now Pat. No. 9,902,488, which is a continuation of application No. 15/092,257, filed on Apr. 6, 2016, which is a continuation of application No. 15/092,237, filed on Apr. 6, 2016, which is a continuation of application No. 15/092,219, filed on Apr. 6, 2016.

(51) Int. Cl.
*B64U 10/25* (2023.01)
*B64U 30/12* (2023.01)
*B64U 30/293* (2023.01)
*B64U 50/13* (2023.01)

(56) References Cited

U.S. PATENT DOCUMENTS

| | | | |
|---|---|---|---|
| 2,198,475 A * | 4/1940 | Dorner | B64C 11/28 244/65 |
| 2,369,276 A | 2/1945 | Cameron et al. | |
| 2,416,178 A | 2/1947 | Kearns, Jr. | |
| 2,712,421 A | 7/1955 | Naumann | |
| 2,784,573 A | 3/1957 | Anderson | |
| 2,999,657 A | 9/1961 | Clark | |
| 3,069,115 A | 12/1962 | Strang | |
| 3,250,494 A | 5/1966 | Peterson | |
| 3,666,210 A | 5/1972 | Look et al. | |
| 3,709,634 A | 1/1973 | Lorenz | |
| 3,981,613 A | 9/1976 | Ehrenskjold et al. | |
| 4,095,919 A | 6/1978 | Ehrenskjold et al. | |
| 4,376,979 A | 3/1983 | Fowler et al. | |
| 4,466,775 A | 8/1984 | Martin | |
| 4,730,793 A | 3/1988 | Thurber, Jr. et al. | |
| 4,979,876 A | 12/1990 | Chapman | |
| 5,118,052 A | 6/1992 | Alvarez | |
| 5,192,037 A | 3/1993 | Moorefield | |
| 5,645,249 A | 7/1997 | Hein | |
| 5,671,899 A | 9/1997 | Nicholas et al. | |
| 6,056,237 A | 5/2000 | Woodland | |
| 6,065,933 A | 5/2000 | Secord | |
| 6,119,976 A | 9/2000 | Rogers | |
| 6,260,797 B1 | 7/2001 | Palmer | |
| 6,905,093 B2 | 6/2005 | Dryer et al. | |
| 6,923,404 B1 | 8/2005 | Liu et al. | |
| 6,978,970 B2 | 12/2005 | Purcell, Jr. | |
| 7,185,847 B1 | 3/2007 | Bouchard et al. | |
| 7,584,925 B2 | 9/2009 | Miller et al. | |
| 7,642,492 B2 | 1/2010 | Parine et al. | |
| 7,762,500 B1 | 7/2010 | Dhall | |
| 7,770,857 B2 | 8/2010 | Ruddy | |
| 7,789,343 B2 | 9/2010 | Sarh et al. | |
| 7,832,690 B1 | 11/2010 | Levine et al. | |
| 7,841,559 B1 | 11/2010 | O'Shea | |
| 7,866,610 B2 | 1/2011 | Bousfield | |
| 7,886,544 B2 * | 2/2011 | Koenig | F02C 3/145 416/245 A |
| 8,089,034 B2 | 1/2012 | Hammerquist | |
| 8,113,962 B2 | 2/2012 | Bentrim | |
| 8,256,715 B2 | 9/2012 | Ballard et al. | |
| 8,376,279 B2 | 2/2013 | Parks et al. | |
| 8,492,692 B2 | 7/2013 | Fisher | |
| 8,505,430 B2 | 8/2013 | Miralles et al. | |
| 8,783,604 B2 | 7/2014 | Sanderson et al. | |
| 8,876,039 B2 | 11/2014 | Lubenow et al. | |
| 9,296,270 B2 | 3/2016 | Parks et al. | |
| 9,545,991 B1 | 1/2017 | Alley et al. | |
| 9,555,873 B1 | 1/2017 | Alley et al. | |
| 9,580,165 B1 | 2/2017 | Alley et al. | |
| 9,616,991 B2 | 4/2017 | Wirasnik | |
| 9,701,406 B2 | 7/2017 | Robertson et al. | |
| 9,902,487 B2 | 2/2018 | Alley et al. | |
| 9,902,488 B2 | 2/2018 | Alley et al. | |
| 10,322,794 B1 | 6/2019 | Copp et al. | |
| 10,494,081 B2 | 12/2019 | Alley et al. | |
| 10,913,534 B1 | 2/2021 | Brum | |
| 11,117,649 B2 * | 9/2021 | Alley | B64C 11/28 |
| 11,535,369 B2 * | 12/2022 | Goldstein | B64C 11/28 |
| 11,541,986 B2 | 1/2023 | Alley et al. | |
| 11,541,987 B2 | 1/2023 | Landry | |
| 11,884,388 B2 | 1/2024 | Alley et al. | |
| 11,958,588 B2 | 4/2024 | Alley et al. | |
| 12,365,440 B2 | 7/2025 | Alley et al. | |
| 2003/0094536 A1 | 5/2003 | LaBiche | |
| 2004/0251383 A1 | 12/2004 | McDonnell | |
| 2005/0218260 A1 | 10/2005 | Corder et al. | |
| 2006/0118675 A1 | 6/2006 | Tidwell | |
| 2006/0255205 A1 * | 11/2006 | Gleich | F42B 15/105 244/49 |
| 2007/0018033 A1 | 1/2007 | Fanucci et al. | |
| 2009/0026321 A1 | 1/2009 | Sarh et al. | |
| 2009/0072094 A1 | 3/2009 | Sanderson et al. | |
| 2009/0166477 A1 | 7/2009 | Bousfield | |
| 2009/0206193 A1 | 8/2009 | File | |
| 2009/0249906 A1 | 10/2009 | Chen et al. | |
| 2009/0302151 A1 | 12/2009 | Holmes | |
| 2010/0048069 A1 | 2/2010 | Duncan | |
| 2010/0072325 A1 | 3/2010 | Sambell | |
| 2010/0148011 A1 | 6/2010 | Sanderson | |
| 2011/0001016 A1 | 1/2011 | Skillen et al. | |
| 2011/0226174 A1 * | 9/2011 | Parks | F42B 15/20 114/313 |
| 2013/0099049 A1 | 4/2013 | Reany et al. | |
| 2013/0146716 A1 | 6/2013 | Gettinger | |
| 2014/0032034 A1 | 1/2014 | Raptopoulos et al. | |
| 2014/0091172 A1 | 4/2014 | Arlton et al. | |
| 2014/0117147 A1 | 5/2014 | Hanna et al. | |
| 2014/0353430 A1 | 12/2014 | Rix et al. | |
| 2015/0225072 A1 | 8/2015 | Torre | |
| 2015/0274290 A1 | 10/2015 | Fenny et al. | |
| 2016/0001879 A1 | 1/2016 | Johannesson et al. | |
| 2016/0152329 A1 | 6/2016 | Tzeng et al. | |
| 2016/0167778 A1 * | 6/2016 | Meringer | B64U 30/24 244/17.11 |
| 2016/0176502 A1 | 6/2016 | Snook | |
| 2016/0264232 A1 | 9/2016 | Braincourt et al. | |
| 2016/0304194 A1 | 10/2016 | Bevirt et al. | |
| 2016/0318600 A1 | 11/2016 | Wirasnik | |
| 2016/0347441 A1 | 12/2016 | Wainfan et al. | |
| 2017/0197702 A1 | 7/2017 | Alley et al. | |
| 2017/0203831 A1 * | 7/2017 | López Ferrer | B64C 11/28 |
| 2017/0283042 A1 | 10/2017 | Gamble | |
| 2017/0283050 A1 | 10/2017 | Baek et al. | |
| 2017/0291685 A1 | 10/2017 | Alley et al. | |
| 2017/0291686 A1 | 10/2017 | Alley et al. | |
| 2017/0297698 A1 | 10/2017 | Alber et al. | |
| 2018/0002009 A1 | 1/2018 | McCullough et al. | |
| 2018/0057161 A1 | 3/2018 | Groninga et al. | |
| 2018/0057162 A1 | 3/2018 | Robertson et al. | |
| 2018/0079487 A1 | 3/2018 | Ivans et al. | |
| 2018/0086434 A1 | 3/2018 | Cook et al. | |
| 2018/0111675 A1 | 4/2018 | Buttolph et al. | |
| 2018/0183535 A1 | 6/2018 | Stubblefield, II | |
| 2019/0023374 A1 | 1/2019 | Kahlon et al. | |
| 2019/0055003 A1 | 2/2019 | Luo et al. | |
| 2019/0061914 A1 | 2/2019 | Heranger et al. | |
| 2020/0079492 A1 | 3/2020 | Noskowicz | |
| 2020/0102065 A1 | 4/2020 | Alley et al. | |
| 2021/0403143 A1 | 12/2021 | Alley et al. | |
| 2022/0340259 A1 * | 10/2022 | Yoon | B64C 11/28 |
| 2022/0411047 A1 * | 12/2022 | Mihai | B64C 25/20 |
| 2023/0106432 A1 * | 4/2023 | Baumgartner | G05D 1/221 701/2 |
| 2023/0142917 A1 | 5/2023 | Alley et al. | |

(56) References Cited

U.S. PATENT DOCUMENTS

| | | | |
|---|---|---|---|
| 2023/0234702 A1* | 7/2023 | Watterson, III | B64C 27/48 244/17.23 |
| 2024/0017815 A1 | 1/2024 | Alley et al. | |
| 2024/0208637 A1 | 6/2024 | Alley et al. | |

FOREIGN PATENT DOCUMENTS

| | | | | |
|---|---|---|---|---|
| CA | 2828726 | A1 | 4/2014 | |
| CA | 3005149 | A1 | 5/2017 | |
| CN | 111169620 | | 5/2020 | |
| DE | 2058430 | A1 | 5/1972 | |
| DE | 3240995 | A1 * | 3/2019 | |
| EP | 2604510 | A2 | 6/2013 | |
| EP | 3141474 | A1 * | 3/2017 | B63H 1/14 |
| EP | 3374260 | A1 | 9/2018 | |
| EP | 3536607 | | 1/2024 | |
| GB | 582802 | A | 11/1946 | |
| GB | 2550916 | A * | 12/2017 | B64C 11/04 |
| IL | 262910 | A2 | 6/2013 | |
| IL | 262914 | | 12/2018 | |
| IL | 300908 | | 2/2023 | |
| JP | 201959472 | A | 4/2019 | |
| JP | 201969762 | A | 5/2019 | |
| JP | 2022-528131 | | 6/2022 | |
| WO | WO 2005/023642 | | 3/2005 | |
| WO | WO 2008/010226 | | 1/2008 | |
| WO | WO 2016/046787 | | 3/2016 | |
| WO | 2017037698 | A1 | 3/2017 | |
| WO | 2017082954 | A1 | 5/2017 | |
| WO | WO-2018183535 | A1 * | 10/2018 | B64C 11/28 |
| WO | WO 2019/183402 | | 9/2019 | |
| WO | WO 2025/071609 | | 4/2025 | |

OTHER PUBLICATIONS

International Preliminary Report on Patentability dated Oct. 10, 2019 cited in Application No. PCT/US18/24891, 6 pgs.

U.S. Non-Final Office Action dated Mar. 8, 2018 cited in U.S. Appl. No. 15/471,877, 6 pgs.

U.S. Non-Final Office Action dated Dec. 10, 2018 cited in U.S. Appl. No. 15/471,877, 13 pgs.

U.S. Non-Final Office Action dated Sep. 3, 2019 cited in U.S. Appl. No. 15/471,877, 28 pgs.

U.S. Restriction Requirement dated Mar. 17, 2020 cited in U.S. Appl. No. 15/471,877, 7 pgs. (With References).

U.S. Final Office Action dated Aug. 25, 2020 cited in U.S. Appl. No. 15/471,877, 10 pgs.

U.S. Final Office Action dated Mar. 18, 2021 cited in U.S. Appl. No. 15/471,877, 5 pgs.

Israeli Notice of Deficiencies dated Mar. 29, 2022 cited in Application No. 269770, 3 pgs.

U.S. Non-Final Office Action dated Sep. 14, 2023 cited in U.S. Appl. No. 17/472,388, 19 pgs.

U.S. Appl. No. 18/462,110, Aerial Vehicle with Deployable Components, filed Jan. 29, 2024.

U.S. Appl. No. 18/475,831, Aerial Vehicle with Deployable Components, filed Sep. 27, 2023.

International Search Report in application no. PCT/US2023/075373, mailed on May 17, 2024, in 12 pages.

International Search Report dated Feb. 21, 2017 cited in Application No. PCT/US2016/028649, in 13 pages.

International Preliminary Report on Patentability dated May 2, 2018 cited in Application No. PCT/US2016/028649, in 10 pages.

\* cited by examiner

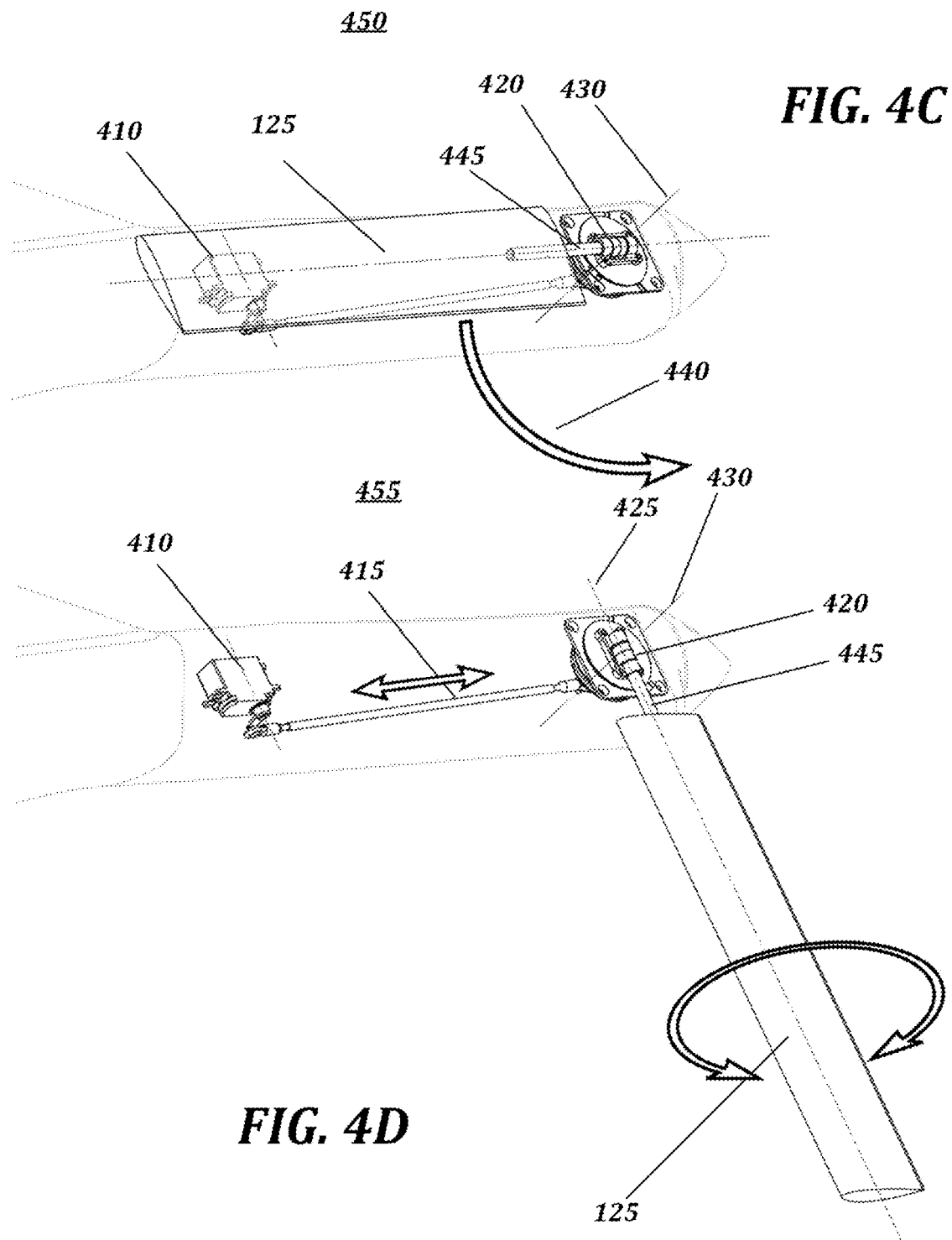

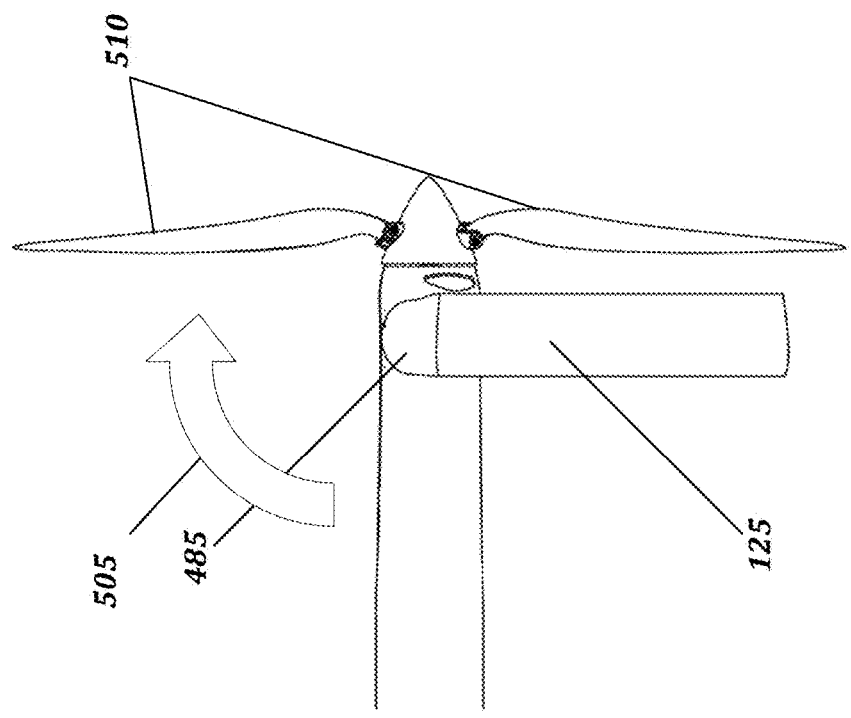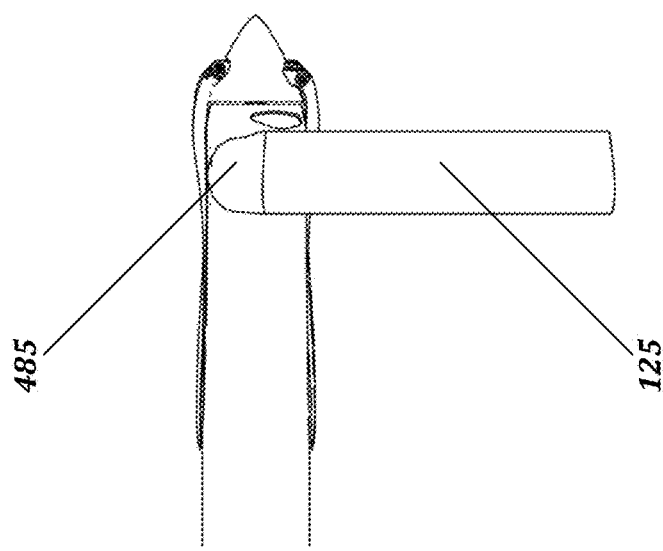
FIG. 5

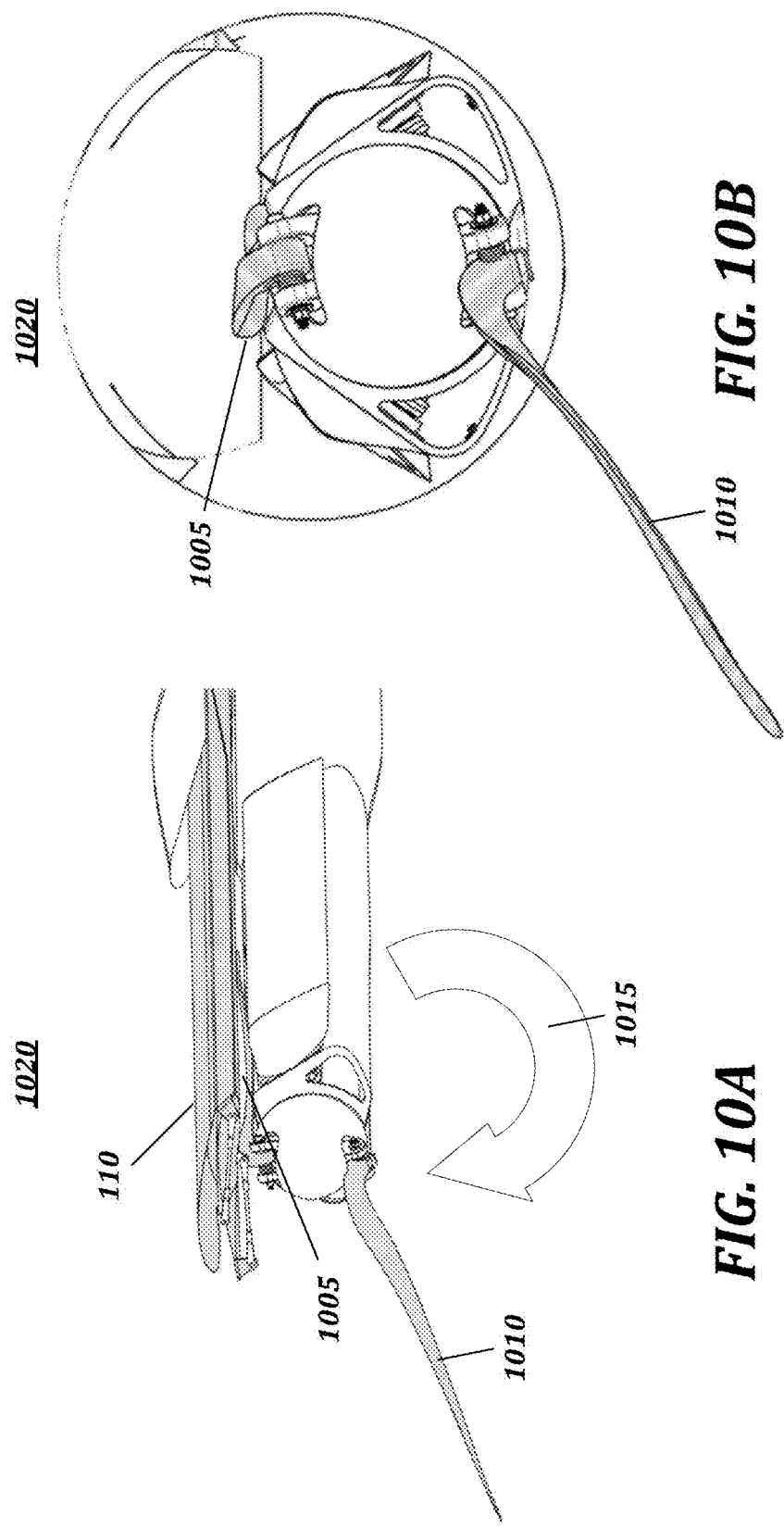

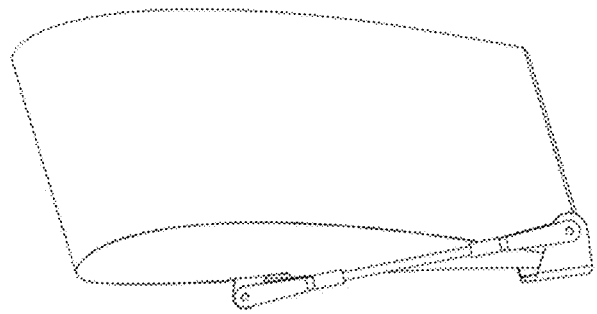
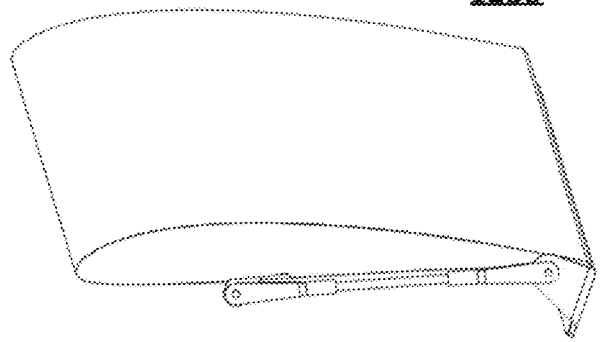
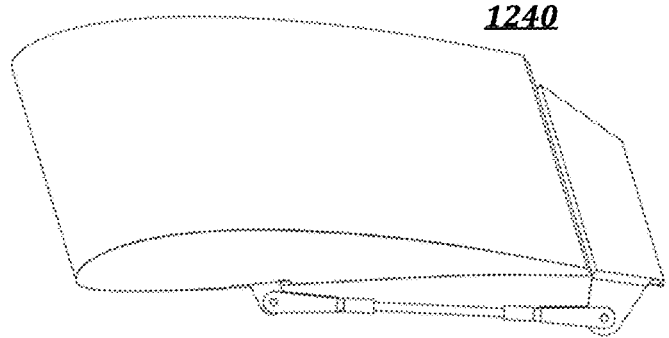
FIG. 12B

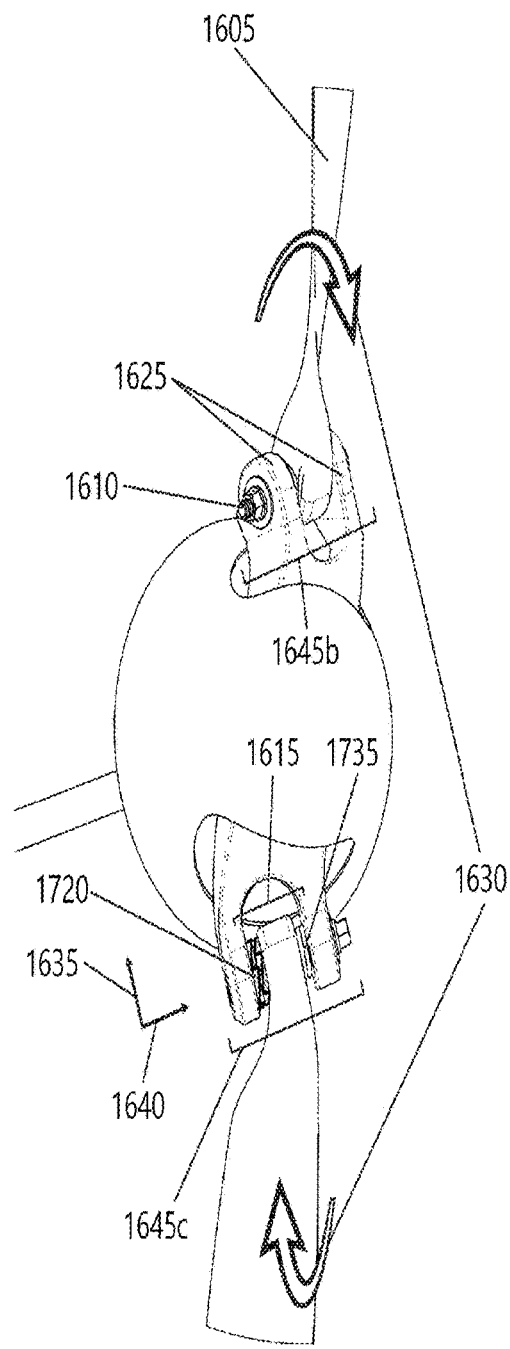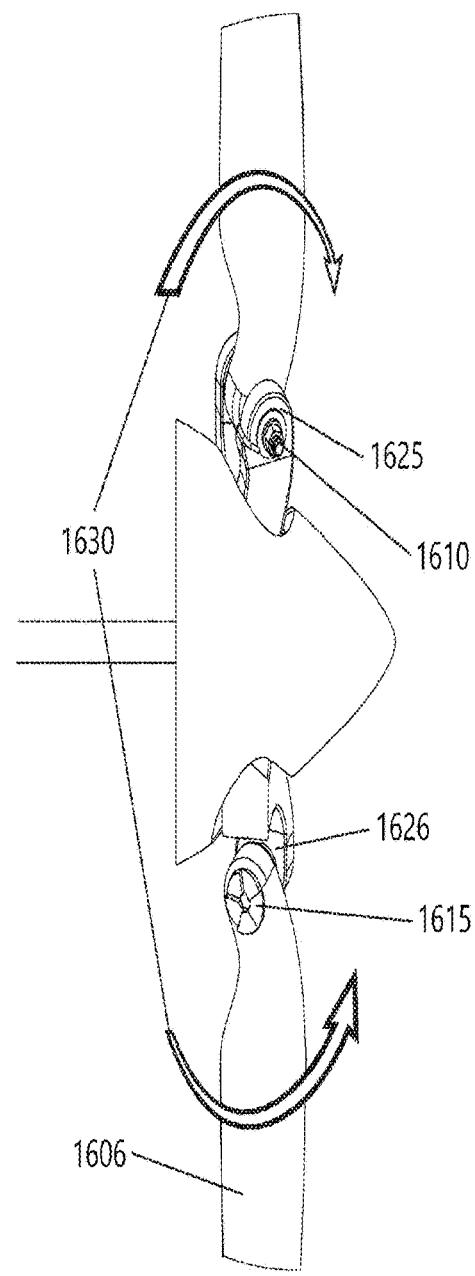
*FIG. 16C*  *FIG. 16D*

FOLDABLE PROPELLER BLADE WITH LOCKING MECHANISM

RELATED APPLICATIONS

The present application is a Continuation of U.S. application Ser. No. 17/472,388 filed on Sep. 10, 2021, which issued on Apr. 16, 2024 as U.S. Pat. No. 11,958,588, which is a Continuation of U.S. application Ser. No. 15/471,877 filed on Mar. 28, 2017, which issued on Sep. 14, 2021 as U.S. Pat. No. 11,117,649, which is a Continuation of U.S. application Ser. No. 15/388,396 filed on Dec. 22, 2016, which issued on Feb. 27, 2018 as U.S. Pat. No. 9,902,488, which is a Continuation of U.S. application Ser. No. 15/092,219 filed on Apr. 6, 2016, which issued on Feb. 28, 2017 as U.S. Pat. No. 9,580,165, which claims the benefit of U.S. Provisional Application No. 62/254,098 filed Nov. 11, 2015, U.S. application Ser. No. 15/471,877, a Continuation-in-Part of U.S. application Ser. No. 15/388,433 filed on Dec. 22, 2016, which issued on Dec. 3, 2019 as U.S. Pat. No. 10,494,081, which is a Continuation of U.S. application Ser. No. 15/092,237 filed on Apr. 6, 2016, which issued on Jan. 31, 2017 as U.S. Pat. No. 9,555,873, which claims the benefit of U.S. Provisional Application No. 62/254,098 filed Nov. 11, 2015, U.S. application Ser. No. 15/471,877 is also a Continuation-in-Part of U.S. application Ser. No. 15/388,478 filed on Dec. 22, 2016, which issued on Feb. 27, 2018 as U.S. Pat. No. 9,902,487, which is a Continuation of U.S. application Ser. No. 15/092,257 filed on Apr. 6, 2016, which issued on Jan. 17, 2017 as U.S. Pat. No. 9,545,991, which claims the benefit of U.S. Provisional Application No. 62/254,098 filed Nov. 11, 2015. Each of the above-referenced applications is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to unmanned aerial vehicles.

BACKGROUND

Unmanned aerial vehicles may be used for a plurality of applications. Such applications comprise commercial applications including surveillance and filming, and for military applications, reconnaissance and tactical missions. In certain circumstances, compact configurations can be beneficial to enabling particular types of missions. For example, compact configurations reduce space and enable various deployment options. However, current compact configurations are limited in flight range, endurance, and payload capacity.

BRIEF OVERVIEW

Embodiments of the present disclosure provide an improved aerial vehicle with deployable components. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

An unmanned aerial vehicle with deployable components (UAVDC) is disclosed. The UAVDC may comprise a fuselage, at least one wing, and at least one stabilizer. In some embodiments, the UAVDC may further comprise a propulsion means and/or a modular payload. The UAVDC may be configured in a plurality of arrangements. For example, in a compact arrangement, the UAVDC may comprise the at least one wing stowed against the fuselage and the at least one stabilizer stowed against the fuselage. In a deployed arrangement, the UAVDC may comprise the at least one wing deployed from the fuselage and the least one stabilizer deployed from the fuselage. In an expanded arrangement, the UAVDC may comprise the at least one wing telescoped to increase a wingspan of the deployed arrangement.

In various embodiments, a UAVDC with a telescoping wing system may be provided. The telescoping wing system may comprise a first wing section comprising a substantially hollow interior, a second wing section configured to be stowed within the interior of the first wing section. The second wing section may comprise an actuator configured to drive a belt coupled to the internal surface of the first wing section such that, upon actuation, a displacement of the attached segment of the belt causes the first wing section to traverse at least a portion of a length of the second wing section.

In the first configuration, the first wing section and the second wing section may form a first wingspan in a first arrangement, the first arrangement comprising the second wing section stowed within the interior of the first wing section. In a second configuration, the first wing section and the second wing section may form a second wingspan in a second arrangement, the second arrangement comprising the first wing section displaced along at least a portion of the length of the second wing section.

Still consistent with embodiments of the present disclosure, the UAVDC may comprise a fuselage, and at least one stabilizer configured to pivot about a first axis and a second axis. The at least one stabilizer may be configurable in at least the following arrangements: a compact arrangement comprising, wherein the at least one stabilizer is stowed against the fuselage, and a deployed arrangement, wherein the least one stabilizer is deployed from the fuselage by pivoting about the first axis.

The UAVDC may further comprise a pushrod configured to pivot the at least one stabilizer about the second axis. In some embodiments, the UAVDC may comprise a flexible fairing at the base of the stabilizer configured to enable the stabilizer to pivot about second axis while maintaining an aerodynamic efficiency.

In yet further embodiments, the UAVDC may comprise a fuselage comprising a modular payload section; at least one wing configurable in a first arrangement and a second arrangement, wherein the first arrangement comprises the at least one wing stowed against the fuselage, and wherein the second arrangement comprises the wings deployed for flight at a first deployment angle; a fairing positioned relatively at a base of the at least one wing, the fairing being constructed of a flexible material comprising at least one slit and at least one cutout designed to enabling a sweeping of the at least one wing from the first arrangement to the second arrangement, the fairing being configurable in: a first configuration to accommodate the first arrangement, and a second configuration to accommodate the second arrangement; an actuator coupled to a sweeping gearbox configured to actuate the sweeping of the at least one wing from the first arrangement to the second arrangement.

As will be detailed below, it should be understood that a single wing may be comprised of two left and right wing sections (a first section and a second section). The two wing sections may, throughout the present disclosure, be referred to as two wings or two wing segments. Accordingly, in some embodiments, the two wings may stacked against the fuselage in the first arrangement, the stacked configuration comprising a top wing and a bottom wing with the top wing vertically offset from the bottom wing in the first arrangement. In yet further embodiments, at a transition from the first arrangement to the second arrangement, the two wings may be configured to telescope to expand a wing span in the second arrangement.

Embodiments of the present disclosure may further comprise at least one control surface (e.g. a stabilizer) configured to deploy from a first stabilizer configuration stowed against the fuselage to a second stabilizer configuration deployed for flight at a second deployment angle.

In some embodiments, deployment of the at least one stabilizer may employ at least one spring, wherein the at least one spring is configured to force the at least one stabilizer from the first stabilizer configuration to the second stabilizer configuration.

The UAVDC may further comprise a propulsion mechanism. In some embodiments, the propulsion mechanism may comprise a propeller, wherein the propeller comprises at least one blade configured to fold into a first propeller arrangement and expand in a second propeller arrangement. The fuselage may comprise at least one groove configured to receive at least one blade of the propeller in the first propeller arrangement, and the propeller may be configured to unfold to the second propeller arrangement by means of at least one of the following: propeller blade springs, aerodynamic force, or a centripetal force from a rotation of the propeller.

The UAVDC may further comprise one or more foldable propeller blades. A foldable propeller blade may pivot or excurse about a hinge from a stowed to a deployed configuration (and vice versa). A foldable propeller blade may experience unwanted forward folding due to forces acting upon the foldable propeller blade. In some embodiments, a foldable propeller blade may comprise a locking mechanism to prevent forward folding. A locking mechanism can comprise various means for preventing motion, such as pin and ramp, ratchet and pawl, magnetic, and spring-based systems. In some embodiments, a locking mechanism may engage when one or more foldable propeller blades enter a deployed configuration. This may keep propeller blades in a deployed configuration even if counteracting forces would tend to push foldable propeller blades back towards a stowed configuration.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 4C illustrates another view of the stabilizers in the first configuration;

FIG. 4D illustrates another view of the stabilizers in the second configuration;

FIG. 5 illustrates an example of deployable propeller blades and a direction of deployment;

FIG. 10A illustrates a propeller blade confined by wings;

FIG. 10B illustrates a deployed propeller blade oriented with a free stream;

FIG. 12B illustrates a plurality of configurations for the ailerons;

FIG. 16C illustrates another view of an example of a propeller assembly with a locking mechanism;

FIG. 16D illustrates another view of an example of a propeller assembly with a locking mechanism;

DETAILED DESCRIPTION

Figure 1A:
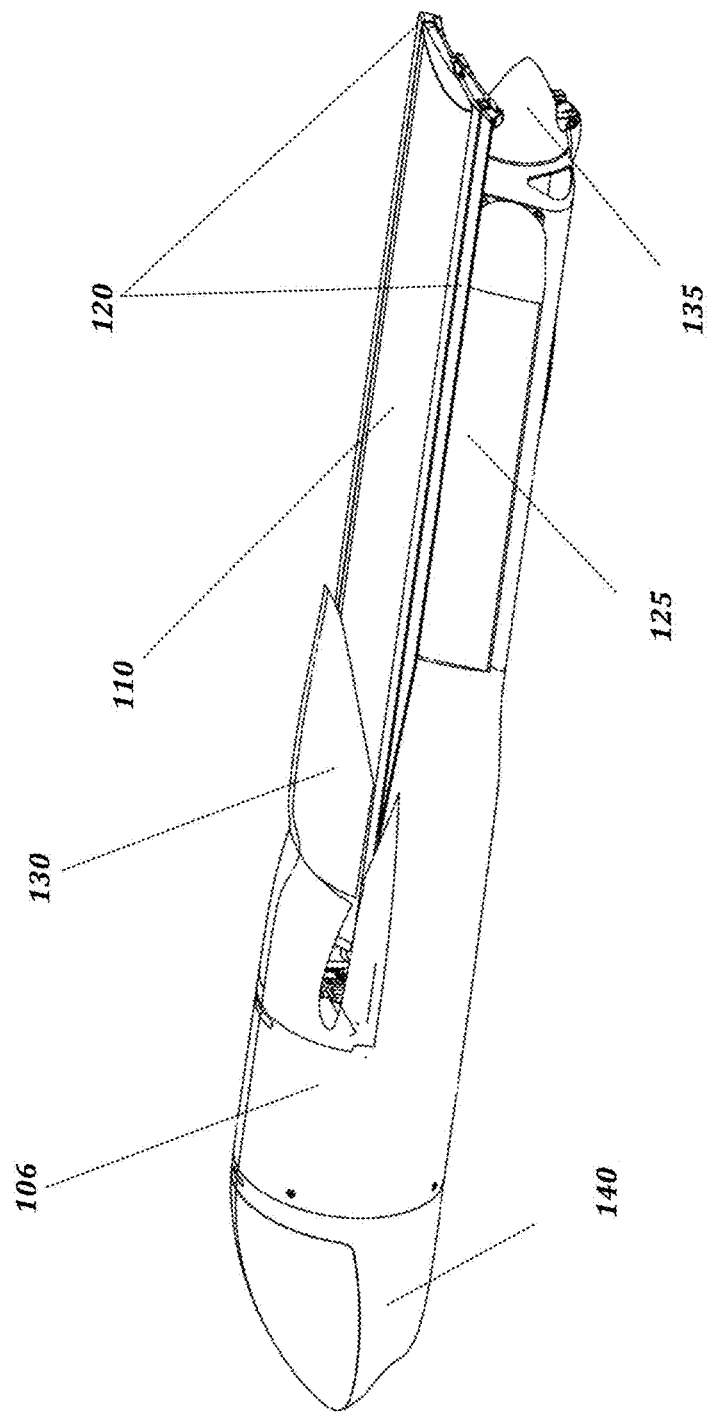
FIG. 1A illustrates an unmanned aerial vehicle with deployable components in a first configuration.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and an example of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of unmanned aerial vehicles, embodiments of the present disclosure are not limited to use only in this context. For example, embodiments of the present disclosure may be employed on manned and unmanned aerial vehicles.

I. OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

An improved unmanned aerial vehicle with deployable components (UAVDC) is provided in the various embodiments disclosed herein. Various aspects of the UAVDC lead to improvements over conventional unmanned aerial vehicles, including, but not limited to, for example, improved portability, deployment, post-deployment transition to flight control, aerodynamic efficiency and flight endurance, payload capacity, and maximized mission capability over conventional unmanned aerial vehicles. As will be detailed below, the UAVDC of the present disclosure includes a number of features that lead to the aforementioned improvements, including, but not limited to, for example, trailing-edge hinged ailerons, deployable stabilizers, gearbox, fairing, and sweeping and telescoping wing implementations.

The UAVDC may be configured in a plurality of arrangements. A first configuration may be a compact arrangement suitable in, for example, storage and launching embodiments, while a second configuration may be a deployed arrangement suitable in, for example, launch recovery and flight, and a third configuration may be an expanded configuration suitable in, for example, high-endurance flight. As will be detailed below, the UAVDC may be fully functional and operable in intermediary configurations between these three configurations to provide some of the advantages of the improved UAVDC at higher airspeeds.

FIG. 1A illustrates an example of a first configuration (e.g., compact arrangement 102). Compact arrangement 102 may enable convenient storage and transportation of the UAVDC. In addition, compact arrangement 102 may enable certain launch methods, such as a launch from, for example, a tube or a release from, for example, an aircraft's weapons/bomb bay or wing attachment.

Consistent with embodiments of the present disclosure, the UAVDC may be deployed after launch into the deployed arrangement that is suitable to survive the high aerodynamic loads of launch recovery and high-speed flight. During the flight, the UAVDC may be further deployed into the expanded arrangement that is suitable for efficient, long-endurance flight. It should be understood that the term "deploy" and "deployment" may refer to the deployable components moving from one UAVDC configuration to another.

Figure 1B:
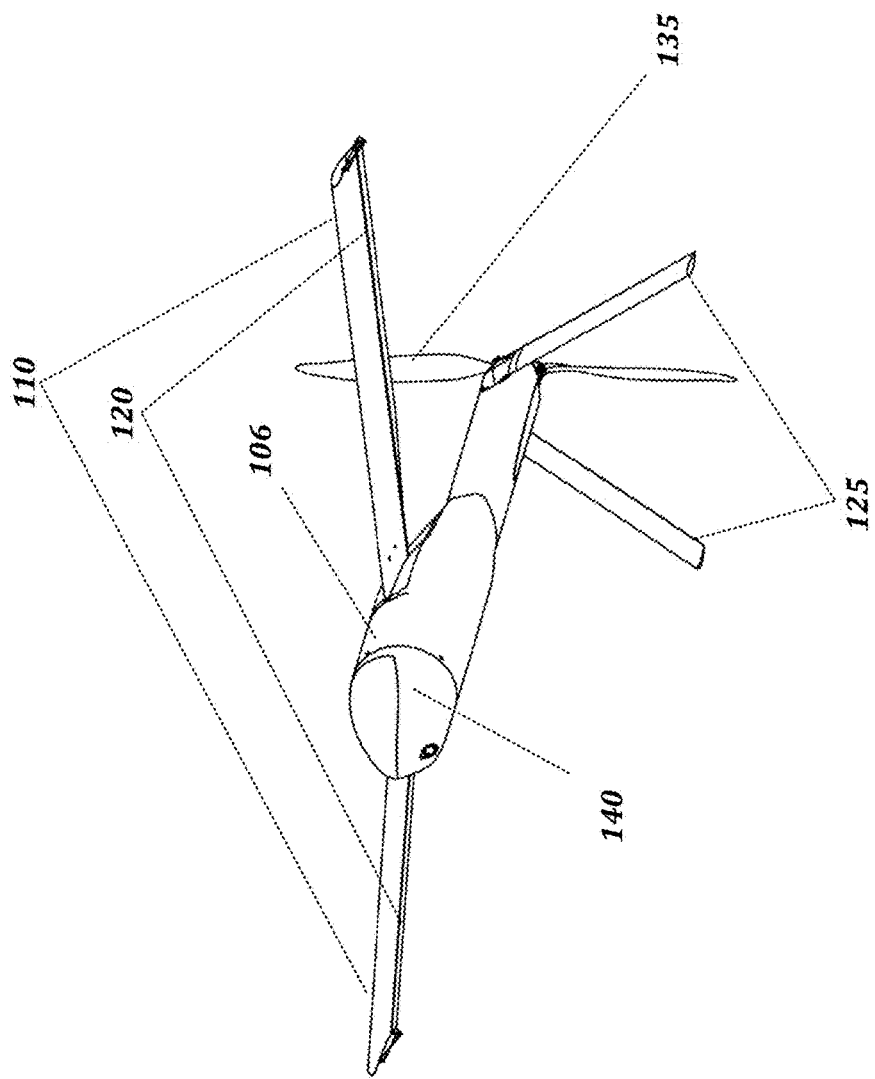
FIG. 1B illustrates the unmanned aerial vehicle with deployable components in a second configuration.

FIG. 1B illustrates an example of a second configuration (e.g. deployed arrangement 104). By using a deployed arrangement 104, embodiments may be able sustain the higher aerodynamics loads associated with flight at a high airspeed or high-g pull-up maneuvers. In this way, at least one of the intermediary configurations (e.g., the deployed arrangement 104) may be used in a launch recovery, wherein the UAVDC has been launched and has not slowed to an airspeed that the third configuration can sustain. Furthermore, the deployed arrangement may be able to sustain high-speed flight more efficiently than the expanded arrangement.

Figure 1C:
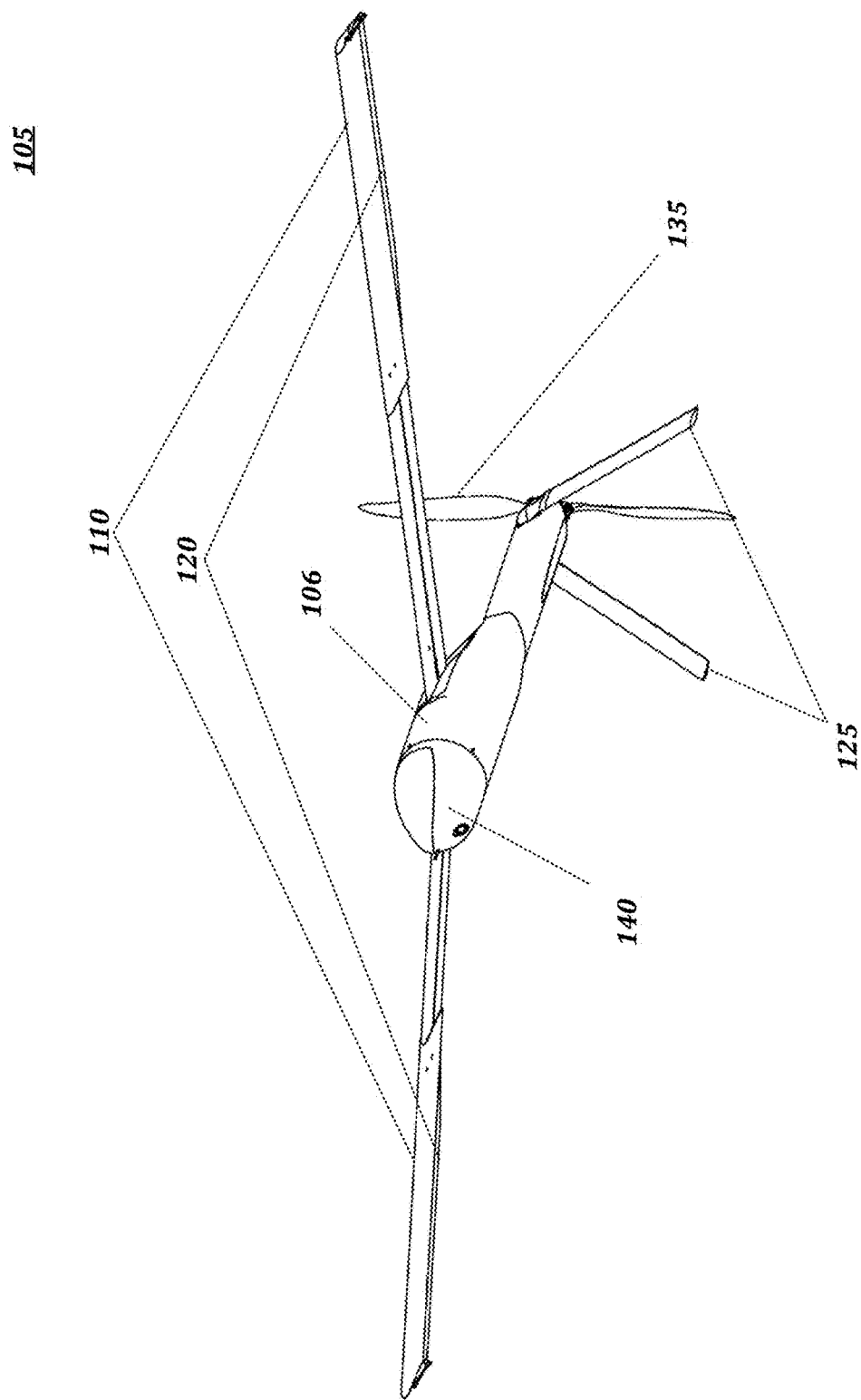
FIG. 1C illustrates the unmanned aerial vehicle with deployable components in a third configuration.

FIG. 1C illustrates an example of a third configuration (e.g., an expanded arrangement 105). By using the expanded arrangement the UAVDC may be able to achieve an increased level of aerodynamic efficiency (i.e. flight endurance) as well as an increased payload weight capacity. In various embodiments, the second configuration (e.g., deployed arrangement 104) and the third configuration (e.g., expanded arrangement 105) may be referred to as a common arrangement, but having wingspans that depend on the extent of the telescoped displacement of the wings.

As will be detailed below, during transformation from compact arrangement 102 to expanded arrangement 105, a UAVDC consistent with embodiments of the present disclosure may implement, but not be limited to, at least one of the following: wings 110 that may be configured to sweep and/or telescope, one or more trailing-edge hinged control surfaces that enable roll control ("ailerons") 120, one or more fold-away actuating stabilizers 125, one or more flexible aerodynamic fairings 130, one or more propulsion mechanisms (e.g., fold-away propeller 135), and a modular payload 140.

In further embodiments, the UAVDC may comprise intermediary configurations between the first configuration and second configuration or the second configuration and the third configuration. In the intermediary configurations, wings 110 may be at various stages of sweep or telescoping. It should be understood that the use of trailing-edge ailerons 120 and externally telescoped outer wing panels 310 may enable the UAVDC to continuously maintain controlled flight during transitions from the first configuration to the third configuration.

Figure 2A:
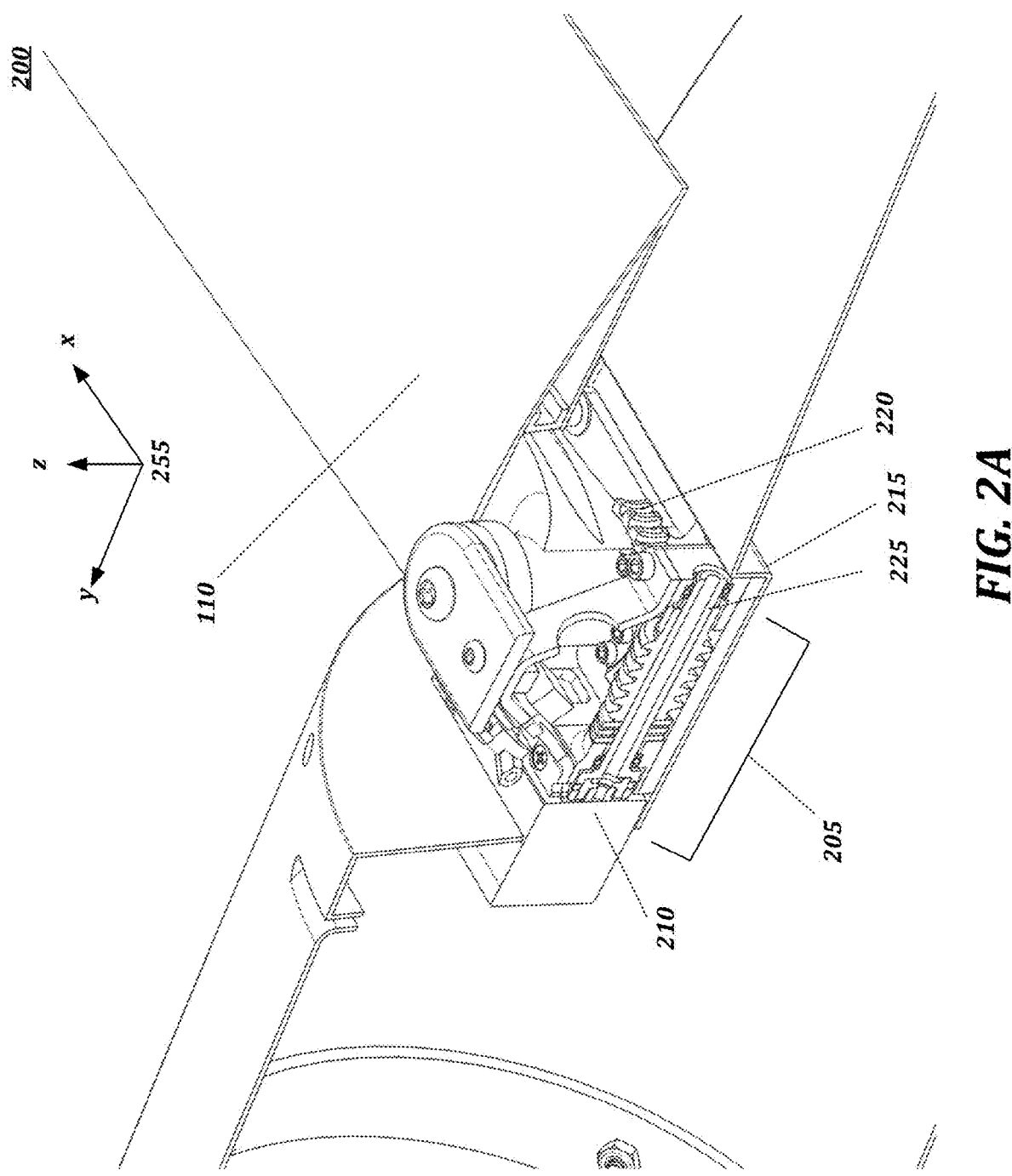
FIG. 2A illustrates a cut-away view of a sweeping gearbox coupled to an actuator.
Figure 2B:
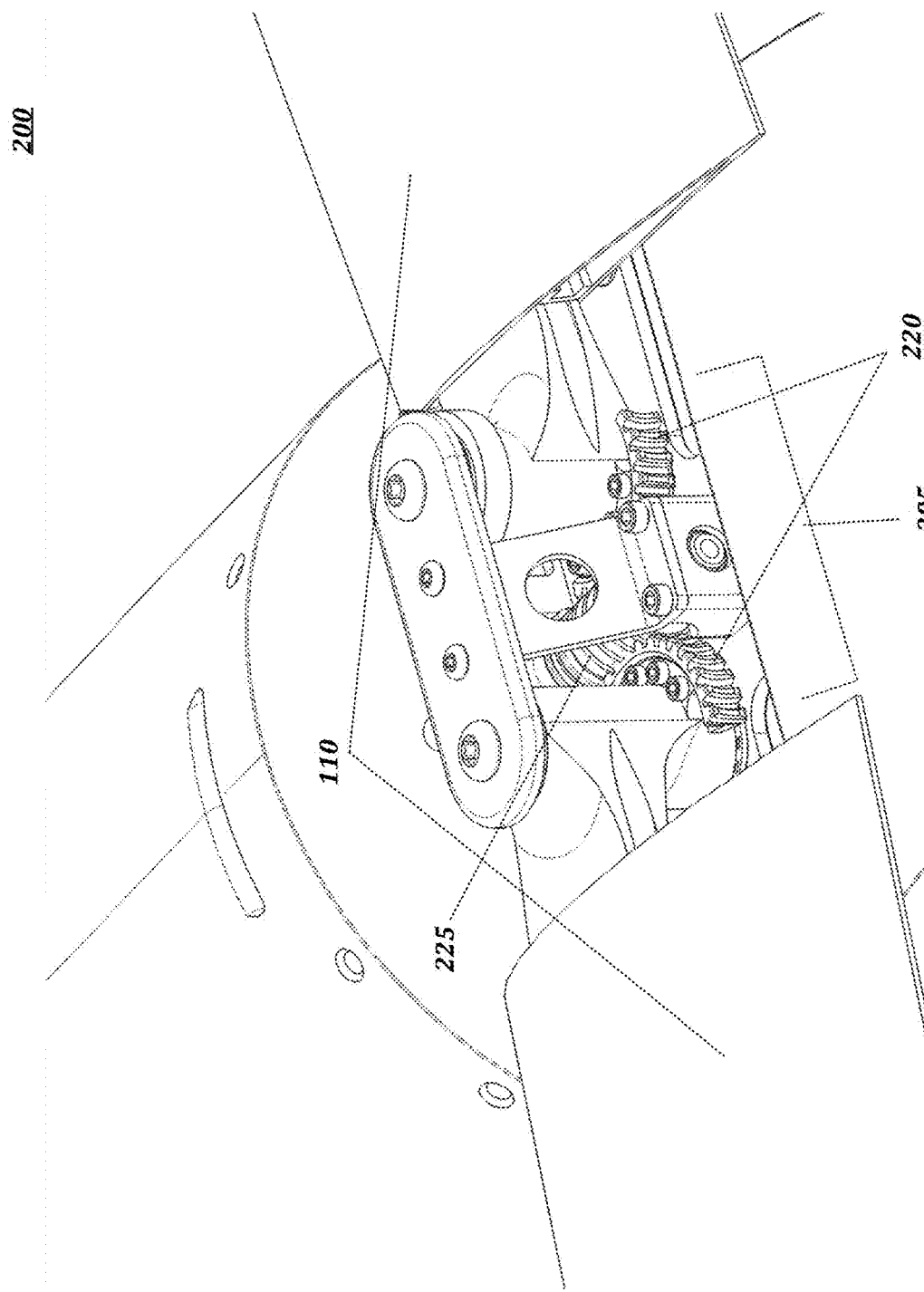
FIG. 2B illustrates a view of the sweeping gearbox.
Figure 2C:
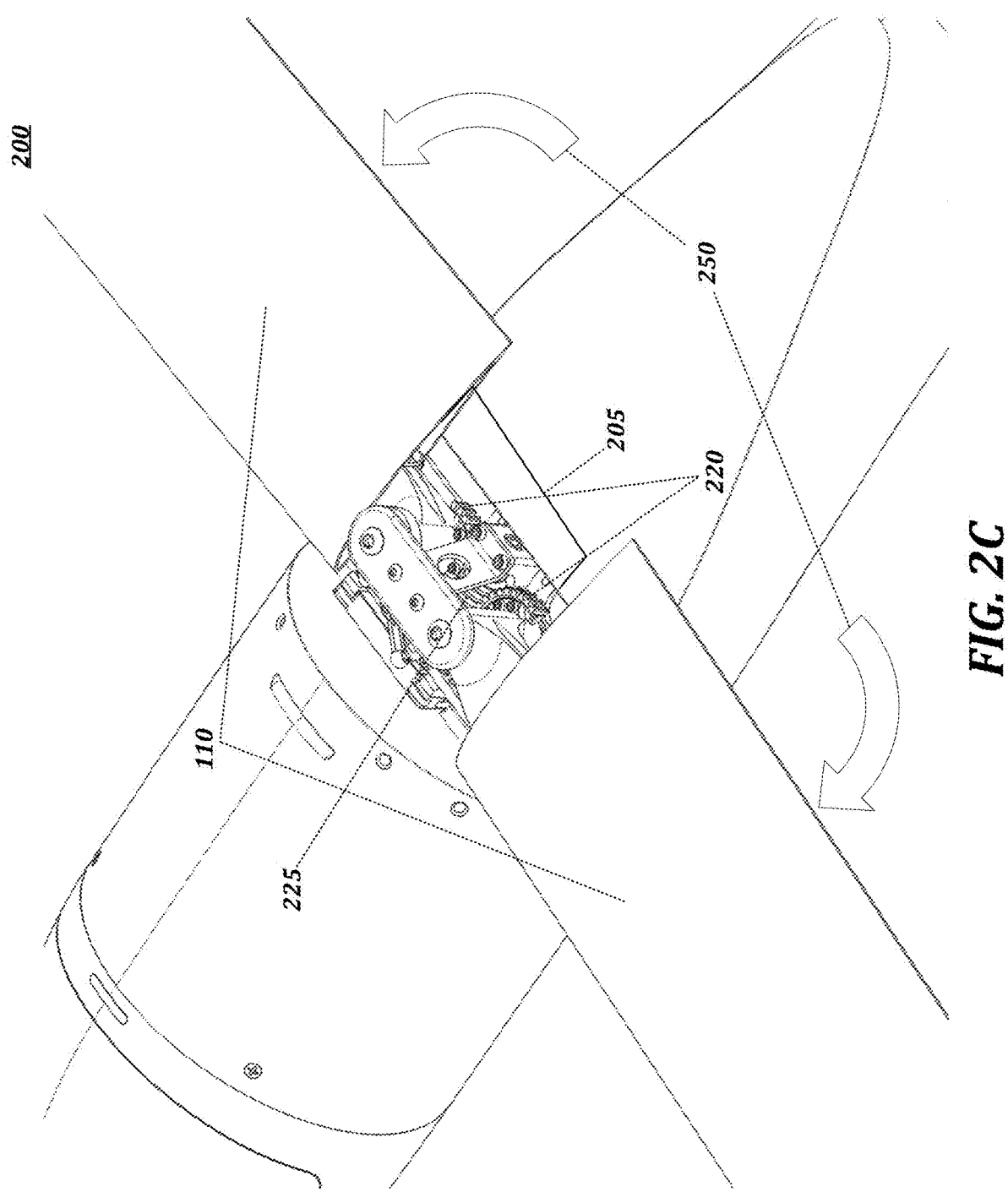
FIG. 2C illustrates another view of the sweeping gearbox and a direction of wing sweeping.
Figure 11A:
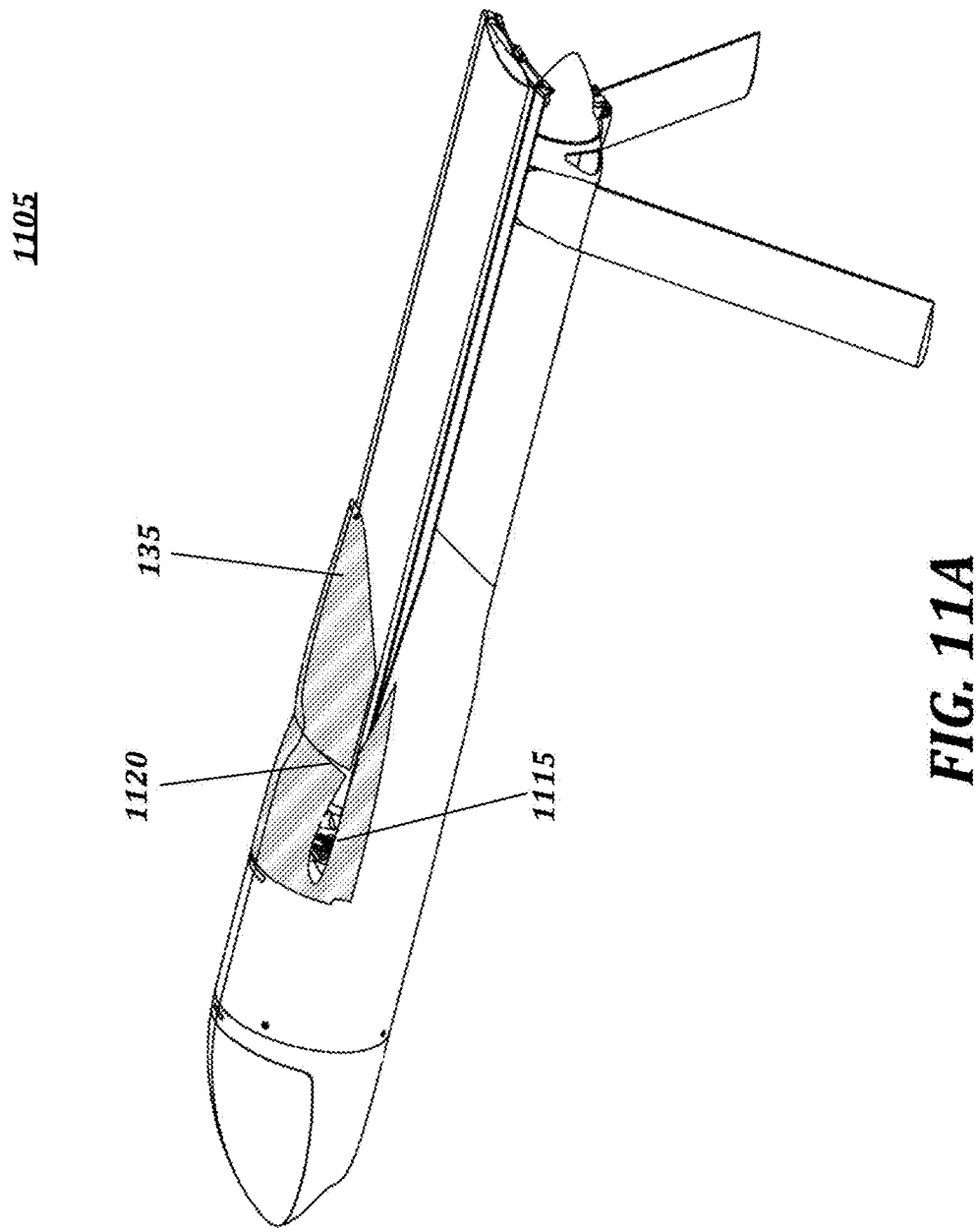
FIG. 11A illustrates a fairing in a first configuration.
Figure 11B:
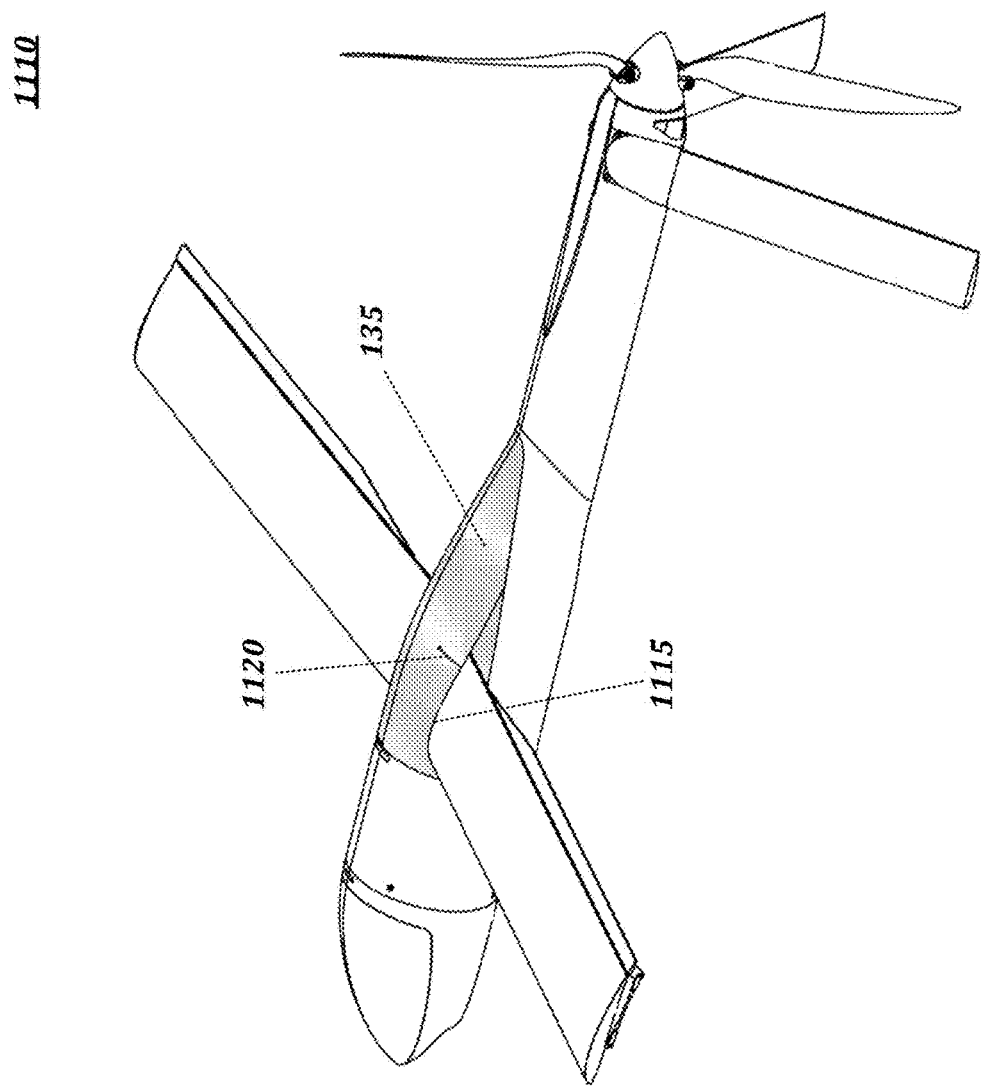
FIG. 11B illustrates the fairing in a second configuration.

In the first configuration, prior to deployment, the aforementioned wings 110, stabilizers 125, and propeller 135 may be stowed against a fuselage 106 of the UAVDC (i.e., folded and out of the way during vehicle launch). Fairing 130 may flex to accommodate wings 110 in their stowed configuration and then be configured to flex in a way so as to accommodate a sweeping motion of wings 110. Once launched, the UAVDC may transform from the first configuration into the second configuration. In the second configuration, wings 110 may be deployed by way of an outward sweeping motion (with fairing 130 flexing in a way to enable the sweeping motion). FIG. 2C illustrates an outward sweeping motion 250. As will be further detailed below, outward sweeping motion 250 may be enabled by, but not limited to, for example, a sweeping gearbox coupled to an actuator. FIGS. 2A-2C illustrate an example of a sweeping gearbox 205 coupled to an actuator 210. Further, sweeping motion 250 of wings 110 may enable configurable wing angles to optimize aerodynamics. Fairing 130 may be designed to accommodate wings 110 in the stored configuration as well as sweeping motion 250. Further, fairing 130 may close around wings 110 in order to maintain the aerodynamic integrity of the UAVDC, as shown in FIG. 11B.

By implementing a gearbox 205 configured to sweep wings 110 as well as orient wings 110 with optimal dihedral angles 265 and angles of incidence 275, embodiments of the present disclosure may provide improvements over conventional systems. For example, in conventional systems, aircrafts that implement sweeping wings and wing angle adjustments require use of secondary mechanics to orient the wing angles. Such secondary mechanics add to weight and cost, as well as provide additional modes of failure.

Figure 3:
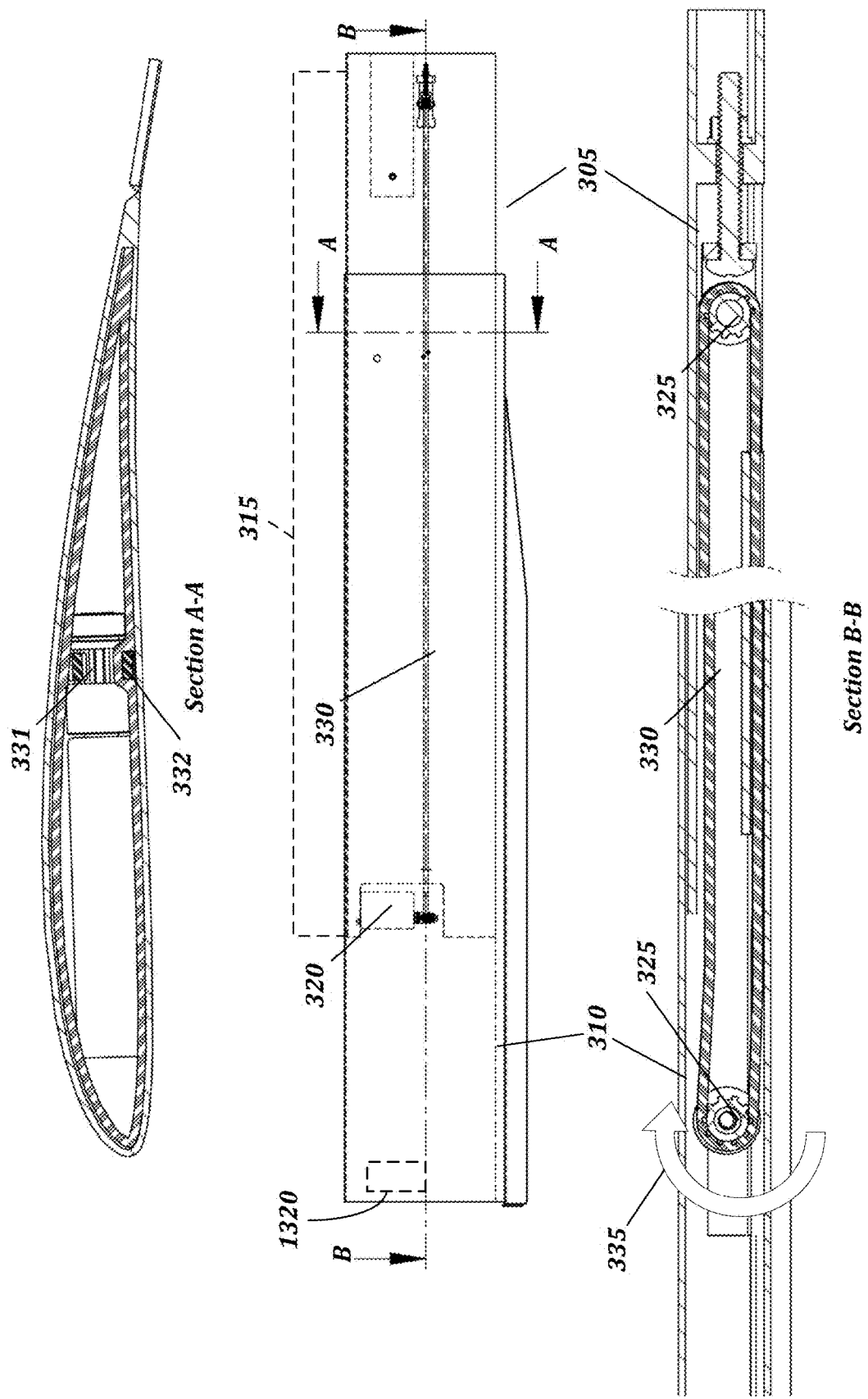
FIG. 3 illustrates an example of telescoping wings.

Still consistent with embodiments of the present disclosure, wings 110 may further be configured to telescope (i.e., expand in length) in the third configuration. Such telescoping wings may comprise a fixed inner section and one or more substantially hollow outer sections that slide along adjacent sections to provide a longer wingspan once deployed. FIG. 3 illustrates an example of telescoping wings 110 comprising a fixed inner section 305 that attaches to fuselage 106 and an outer section 310. In further embodiments, a plurality of nested outer wing sections may be implemented. In this way, wings 110 may be stored in a compact arrangement 102 and later extend (i.e., telescope) to provide additional lift during the expanded arrangement 105. As will be detailed below, a telescoping mechanism ("telescoping means") consistent with embodiments of the present disclosure may employ, for example, a belt system 315, a scissors mechanism, or a piston mechanism to extend and/or retract the wings.

The telescoping means consistent with embodiments of the present disclosure enable a maximized wing span while maintaining roll control throughout the transition between configurations. For example, as the inner section is fixed, the outer sections may comprise a substantially hollow interior so as to enable the fixed inner section to reside within the interior of the outer section. The outer section may then slide outwards (i.e., telescopes), away from fuselage 106, thereby exposing the fixed inner section as it telescopes. The trailing-edge mounted control surfaces (e.g., ailerons 120) are mounted to the outer section and are therefore exposed and operable throughout the deployment and telescoping process; in this way, the wingspan of the UAVDC can expand while continually maintaining controlled flight during the transition (e.g., regardless of the outer section position relative to the inner section position).

In some embodiments, inner section 305 connects to the fuselage 106, while outer section 310 may be telescoped outward from fuselage 106. Trailing-edge ailerons 120 may connect to outer section 310 to enable roll control. In this way, trailing-edge ailerons 120 may provide roll control even when wings 110 are not extended. Trailing-edge ailerons 120 may be connected by a hinge at a rear-most point of the wing in order to maximize an internal volume of the outer section 310, which, in turn, maximizes the overall span of the wing 110 in its third configuration. In various embodiments, other configurations of wing control surfaces, such as spoilers, may be implemented within the spirit and scope of the present disclosure.

By implementing hollow outer telescoping wing section 310 and trailing-edge hinged aileron 120, a plurality of improvements are introduced. A typical telescoping wing utilizes telescoping outer panels that are stored within the fixed inner panel, this precludes the use of ailerons mounted to the outer panels until the wing panels reach a telescoped state. Furthermore, conventional aileron implementations are configured within the wing surface itself, thereby reduce the amount of internal volume available in the wing. The reduced internal volume decreases the available depth of an interior wing section placement in a telescoping wing system, thereby leading to a smaller displacement in a telescoped configuration. In this way, conventional roll control surfaces may reduce the final length of a telescoped wing.

Attaching trailing-edge hinged ailerons 120 to the outer section 310 of the telescoping wing 110 enables the inner section 305 of telescoping wing 110 to be stowed further within the interior of outer section 310 while still providing the necessary roll control to maintain flight in the deployed arrangement, before the wings are telescoped. In turn, when wings 110 are telescoped, the displacement of the outer section 310 is increased by a range greater than that of other telescoping wing systems, thereby leading to the benefits of increased wingspan over a conventional aerial vehicle capable of compact configurations. Further still, extending outer section 310 of the telescoping wing 110 from the fuselage further enables the trailing-edge hinged ailerons 120 to provide increased roll control of the UAVDC.

Consistent with embodiments of the present disclosure, the control surfaces (e.g., trailing-edge hinged ailerons 120) may be operable in all of the UAVDC's configurations. That is, the control surfaces may be operable in the compact arrangement 102, the deployed arrangement 104, and in the expanded arrangement 105. Furthermore, the control surfaces may be operable during the transitionary phases between each of those arrangement.

For example, trailing-edge hinged ailerons 120 may be operable in between the first configuration (e.g., compact arrangement 102) and the deployed arrangement 104 (e.g., engaged in operation at approximately a 45-degree sweep) in order to provide post-launch stabilization for the UAVDC. Moreover, trailing-edge hinged ailerons 120 may be operable when the UAVDC is in the deployed arrangement 104 to provide flight control, as well as the transitionary stage between the deployed arrangement 104 and the expanded arrangement 105. Finally, trailing-edge hinged ailerons 120 may be operable in the expanded arrangement 105 to provide additional, more effective flight control.

Figure 4A:
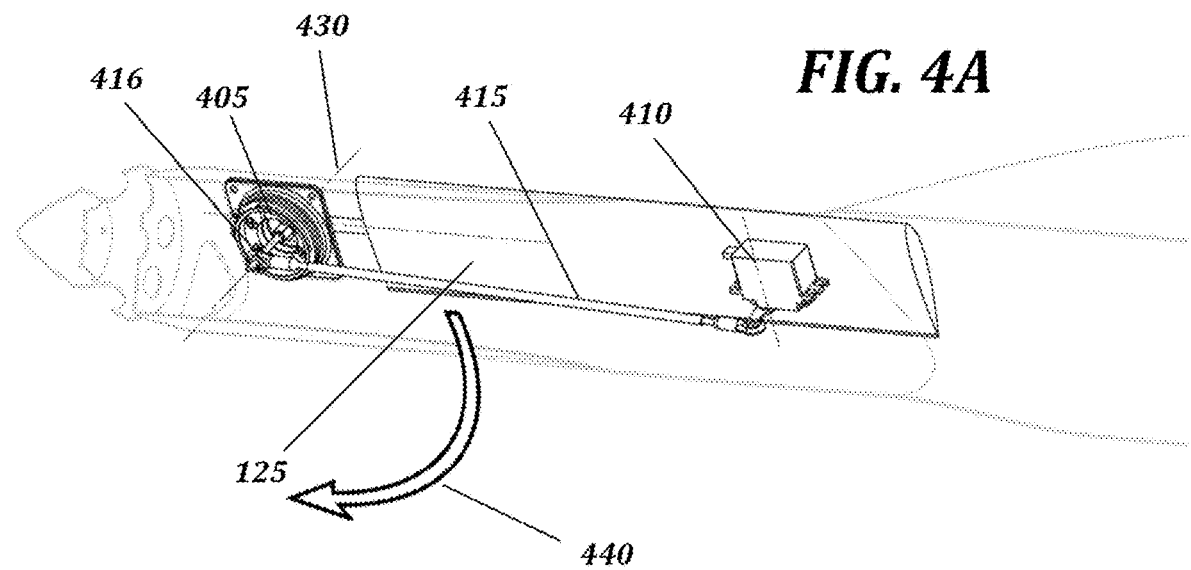
FIG. 4A illustrates an example of stabilizers in a first configuration.
Figure 4B:
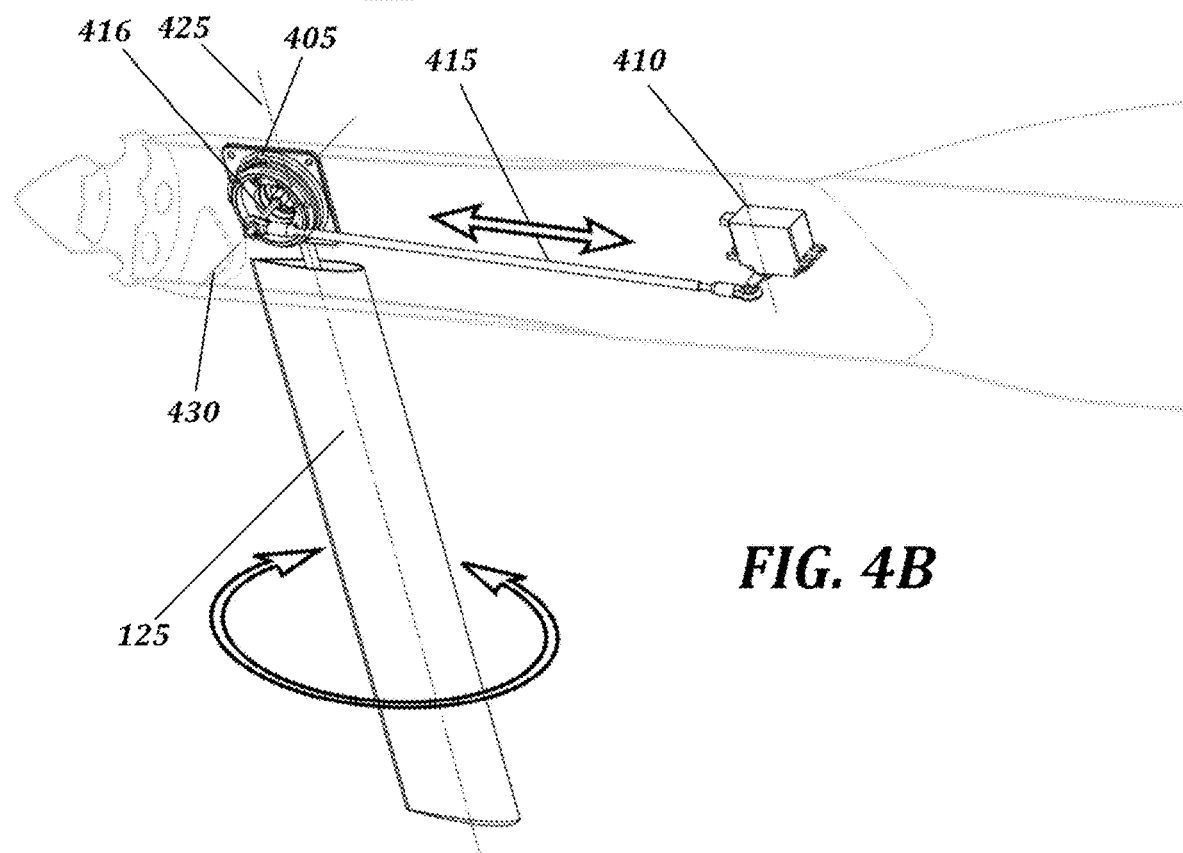
FIG. 4B illustrates an example of the stabilizers in a second configuration.
Figure 4E:
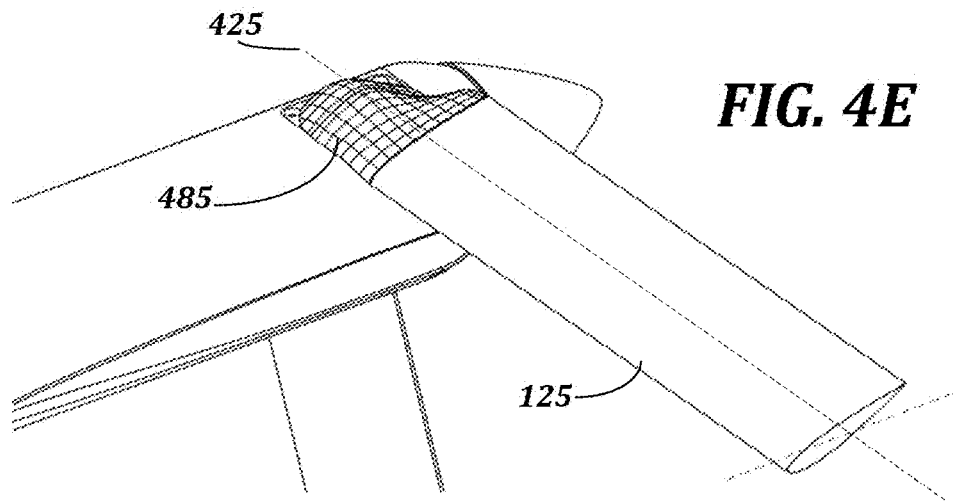
FIG. 4E illustrates an example of stabilizers in a first pivot angle.
Figure 4F:
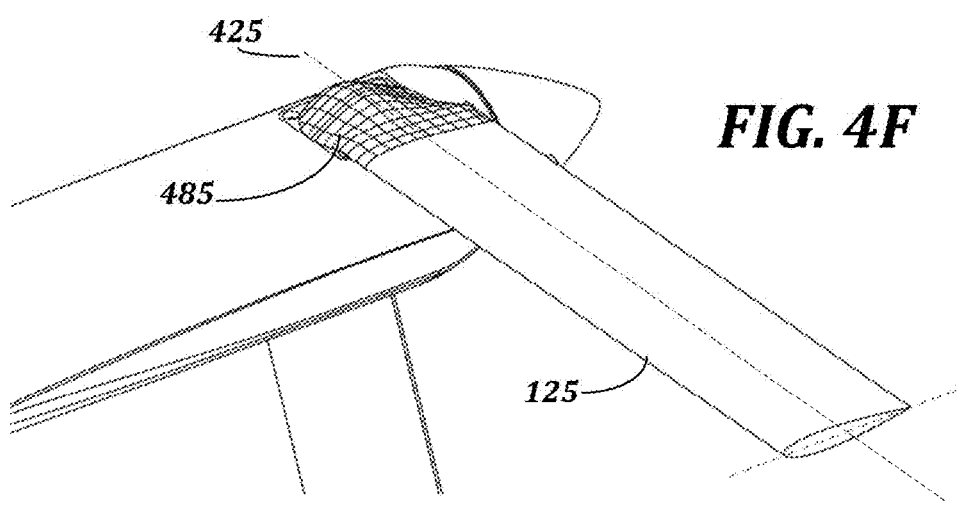
FIG. 4F illustrates an example of stabilizers in a second pivot angle.
Figure 4G:
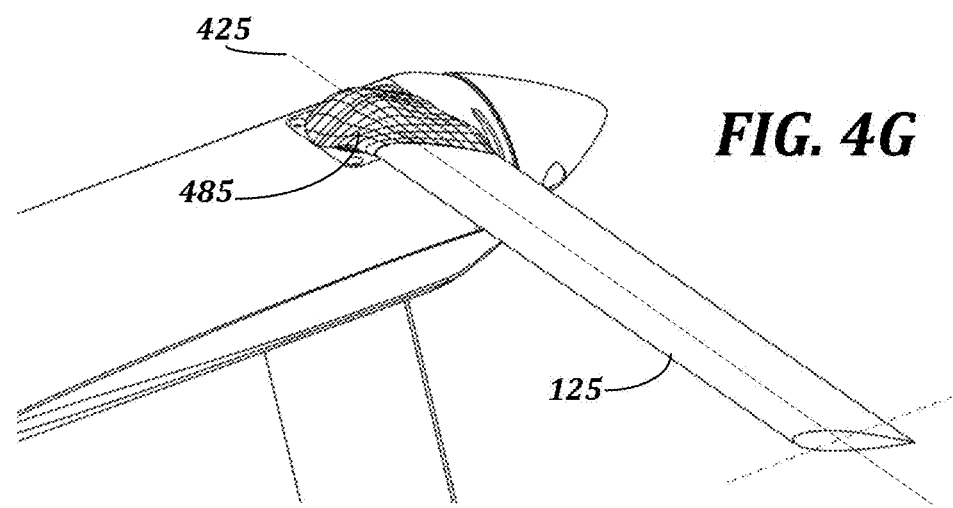
FIG. 4G illustrates an example of stabilizers in a third pivot angle.

One or more stabilizers 125 of the UAVDC may be deployed in the intermediary configurations, second configuration, and/or the third configuration. Stabilizers 125 may deploy from a first stabilizer configuration 450 to a second stabilizer configuration 455 by rotating about axis 430, as shown in FIGS. 4A-4D. Once in the second stabilizer configuration 455, stabilizer 125 can further serve as a control surface, providing flight control by pivoting about axis 425. As will be detailed below, deployment about axis 430 may be implemented via, for example, pre-loaded springs 405. In further embodiments, stabilizers 125 may be deployed upon interfacing with air resistance. For example, when stabilizers 125 interface with an airstream, a resulting drag force may cause stabilizers 125 to move into a deployed configuration. Servos 410 may actuate the stabilizers 125 about axis 425 once stabilizers 125 are deployed. FIGS. 4E-4G illustrate the stabilizer 125 in the deployed configuration, at various pivot angle about axis 425.

Deployable control surfaces, embodied in the present disclosure as stabilizers 125, are improved over conventional systems, for example, by enabling automatic deployment without requiring controlling components (e.g., actuators and linkages) to adjust. Further, by implementing a flexible fairing, the aerodynamic efficiencies may be improved. It should be understood that not all embodiments of the UAVDC may comprise each of the aforementioned components, while other embodiments of the UAVDC may comprise additional components, and yet other embodiments still may comprise various combinations of the embodiments described in the present disclosure.

Propeller 135 of the UAVDC may deploy upon interfacing with the air resistance. In further embodiments, springs and/or centripetal force from a rotation of propeller 135 may be implemented in deploying propeller 135. FIG. 5 illustrates an example of propeller 135 and a direction of deployment 505 for propeller blades 510.

Figure 6A:
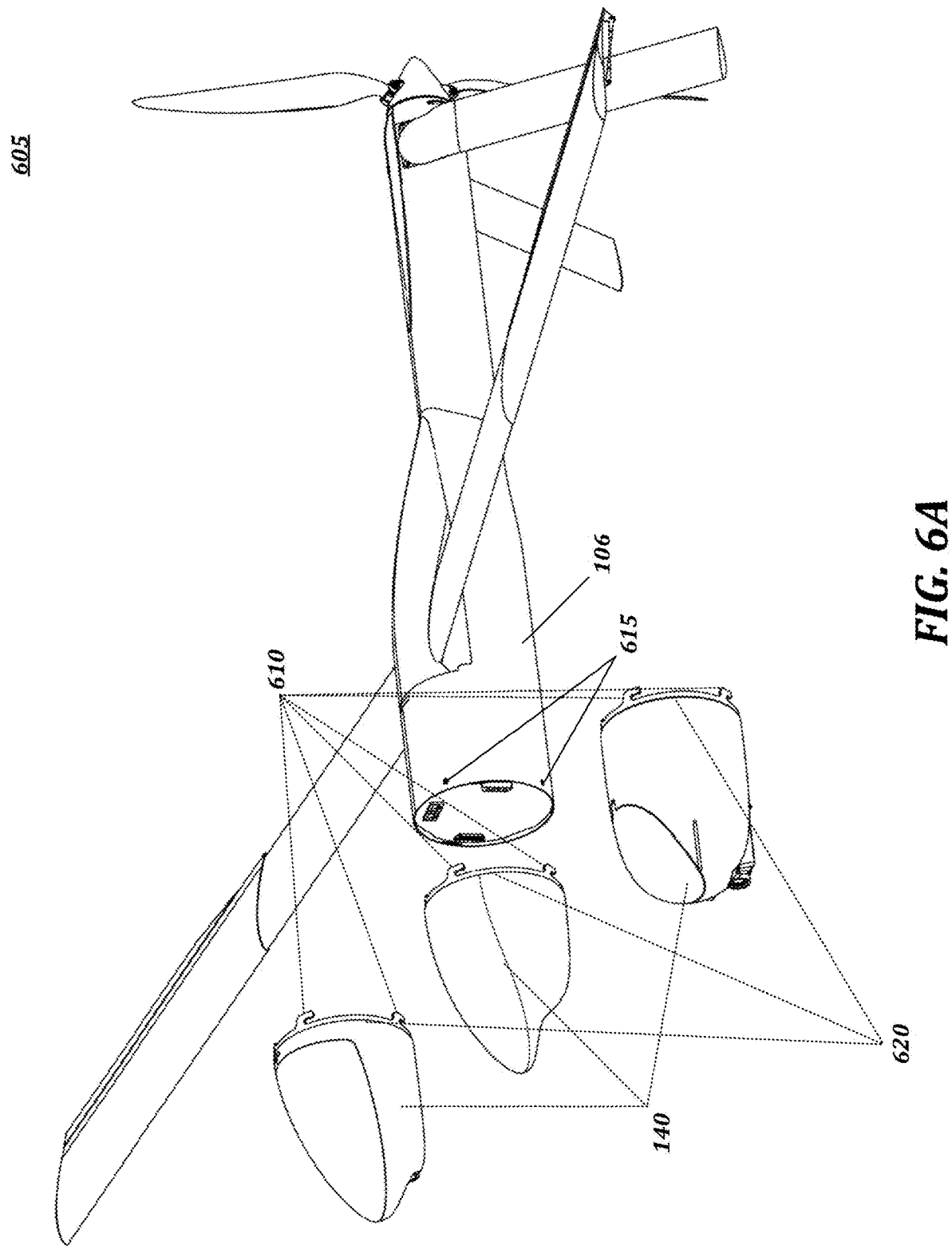
FIG. 6A illustrates an example of a modular payload.

A UAVDC consistent with embodiments of the present disclosure may be configured to receive a modular payload 140. In some embodiments, modular payload 140 may remain fixed in both the first and second configuration. By way of non-limiting example, modular payload 140 may be configured into the UAVDC, serving as a nose of fuselage 106. FIG. 6A illustrates an example of a plurality of modular payloads 140 configured to be attached to fuselage 106 in a fixed position 605. To facilitate modularity, modular payload 140 may comprise hooks 610 configured to hook around pins 615 in a twist-to-lock fashion. In this way, modular payload 140 may be inserted into fuselage 106. A ridge 620 may orient modular payload and provide a flush transition from modular payload 140 to fuselage 106. Further, pins 615 may comprise screw threads to tighten around a nut, thus securing hooks 610, and accordingly, modular payload 140, in place. In further embodiments, modular payload 140 may comprise protrusions that are configured to fit into slots embedded within fuselage 106. Modular payload 140 may be inserted into fuselage 106 along slots configured to receive the protrusions and turned to lock modular payload 140 to fuselage 106.

Figure 6B:
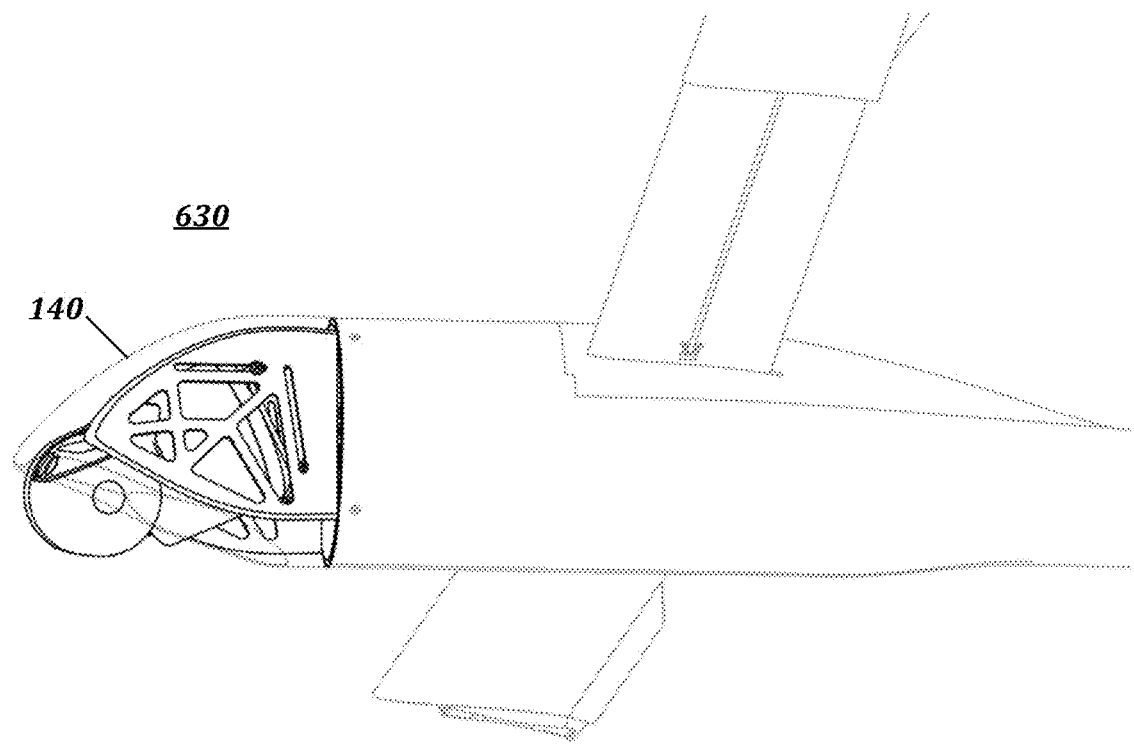
FIG. 6B illustrates an example of a modular payload with deployable components in a first configuration.
Figure 6C:
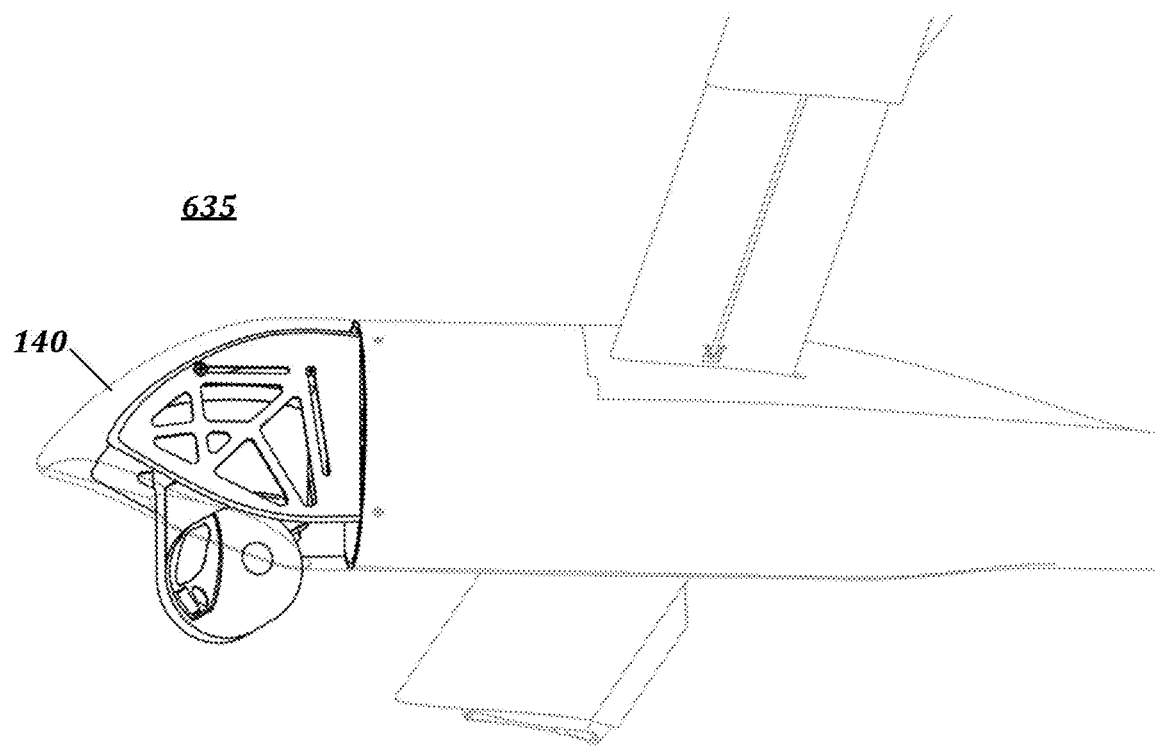
FIG. 6C illustrates an example of the modular payload with deployable components in a second configuration.

While modular payload 140 may be locked in a fixed position 605, it may comprise deployable components within, as shown in FIGS. 6B and 6C, illustrating modular payload in a first configuration 630 and a second configuration 635, respectively.

Figure 6D:
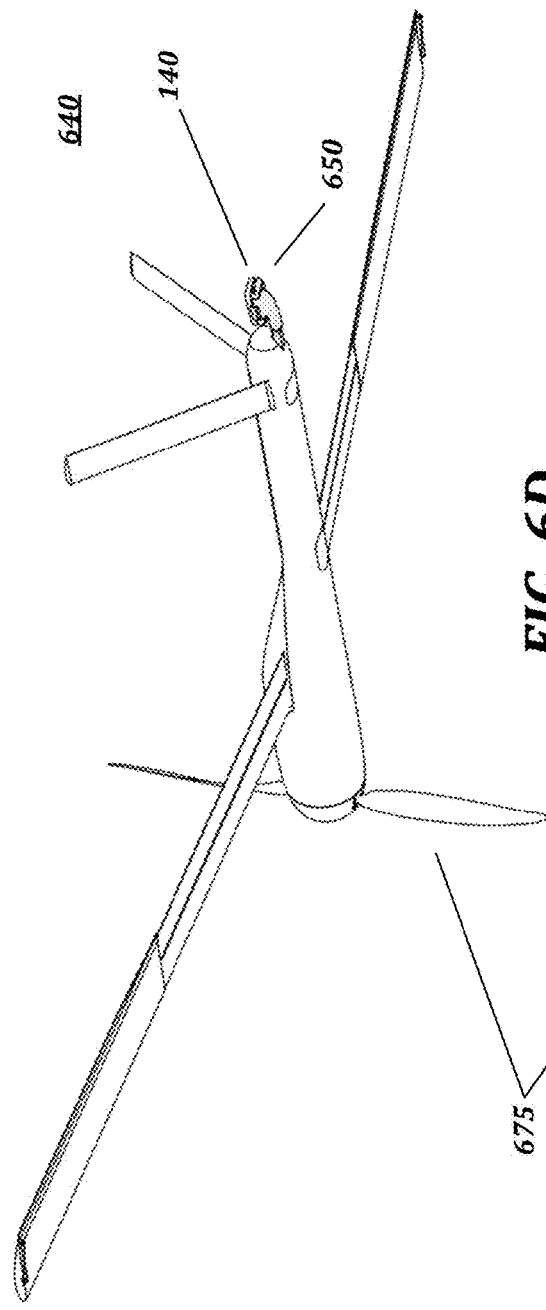
FIG. 6D illustrates an example of another modular payload in a compact configuration.
Figure 6E:
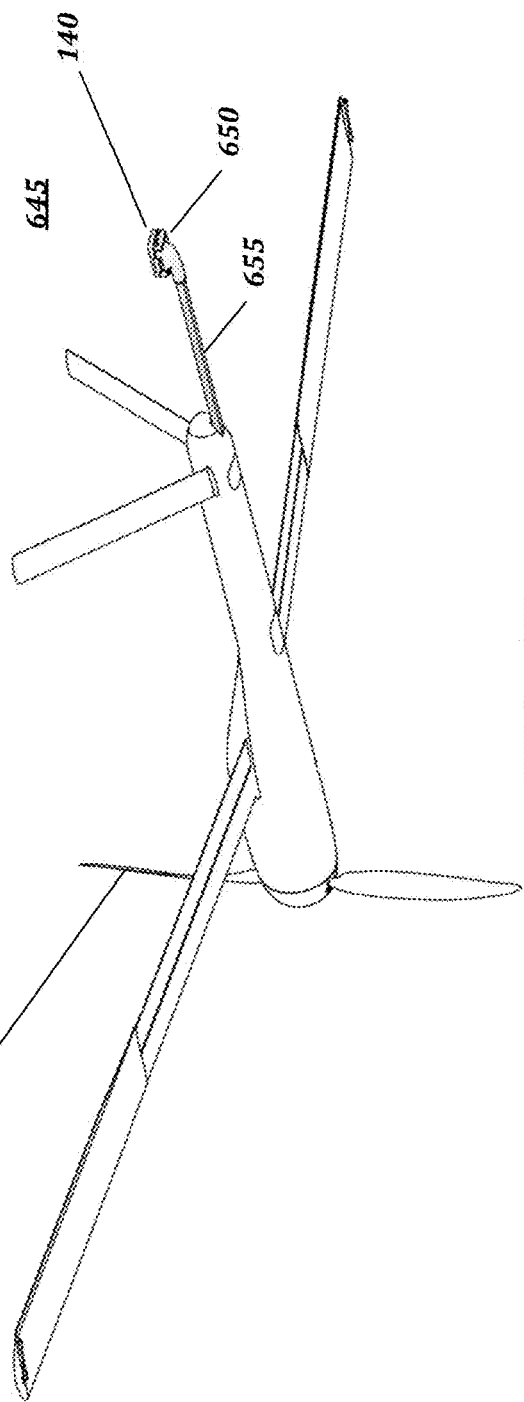
FIG. 6E illustrates an example of the modular payload in a deployed configuration.

In other embodiments, modular payload 140 may have at least two configurations for location with respect to fuselage 106. FIG. 6D illustrates another example of a modular payload 140 in a first position 640; FIG. 6E illustrates modular payload 140 in a second position 645. For example, modular payload 140 may be arranged in first position 640 when the UAVDC is in the first configuration ("compact configuration"), and deployed into a second position 645 while in the second configuration. By way of non-limiting example, the modular payload may be a sensing device 650 configured to a boom 655 telescoping out of the fuselage.

Embodiments of the present disclosure may provide improvements over conventional unmanned aerial vehicles including, but not limited to the following examples:
- Improved aerodynamic efficiency which increases flight endurance;
- Increased payload capacity;
- Launch and transition to flight without the assistance of external aerodynamic treatments such as a parachute or balloon; and
- Maximized mission capability (i.e. its modular payload and reconfigurable and highly efficient airframe enable the UAVDC to efficiently perform a wider array of missions such as, for example, but not limited to, Intelligence Surveillance Reconnaissance (ISR), Signals Intelligence (SIGINT), weather, geophysical, environmental, and the like.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. CONFIGURATION

FIG. 1C illustrates an UAVDC consistent with embodiments of the present disclosure. Embodiments of the present disclosure may comprise a fuselage 106, one or more antennas 705, power source 1310, wings 110 that may be configured to sweep and/or telescope, stabilizers 125, and payload 140. Further embodiments may comprise a propulsion mechanism, such as, for example, propeller 135.

Fuselage 106 may be comprised of, but not limited to, for example, carbon fiber. Further, fuselage 106 may be comprised of, but not limited to, for example, a composite material (e.g., fiberglass, Kevlar, Spectra). In various embodiments, plastics may be used, including, but not limited to 3D printed plastics. Fuselage 106 may take an aerodynamic configuration to facilitate speed and reduced air resistance.

Figure 7:
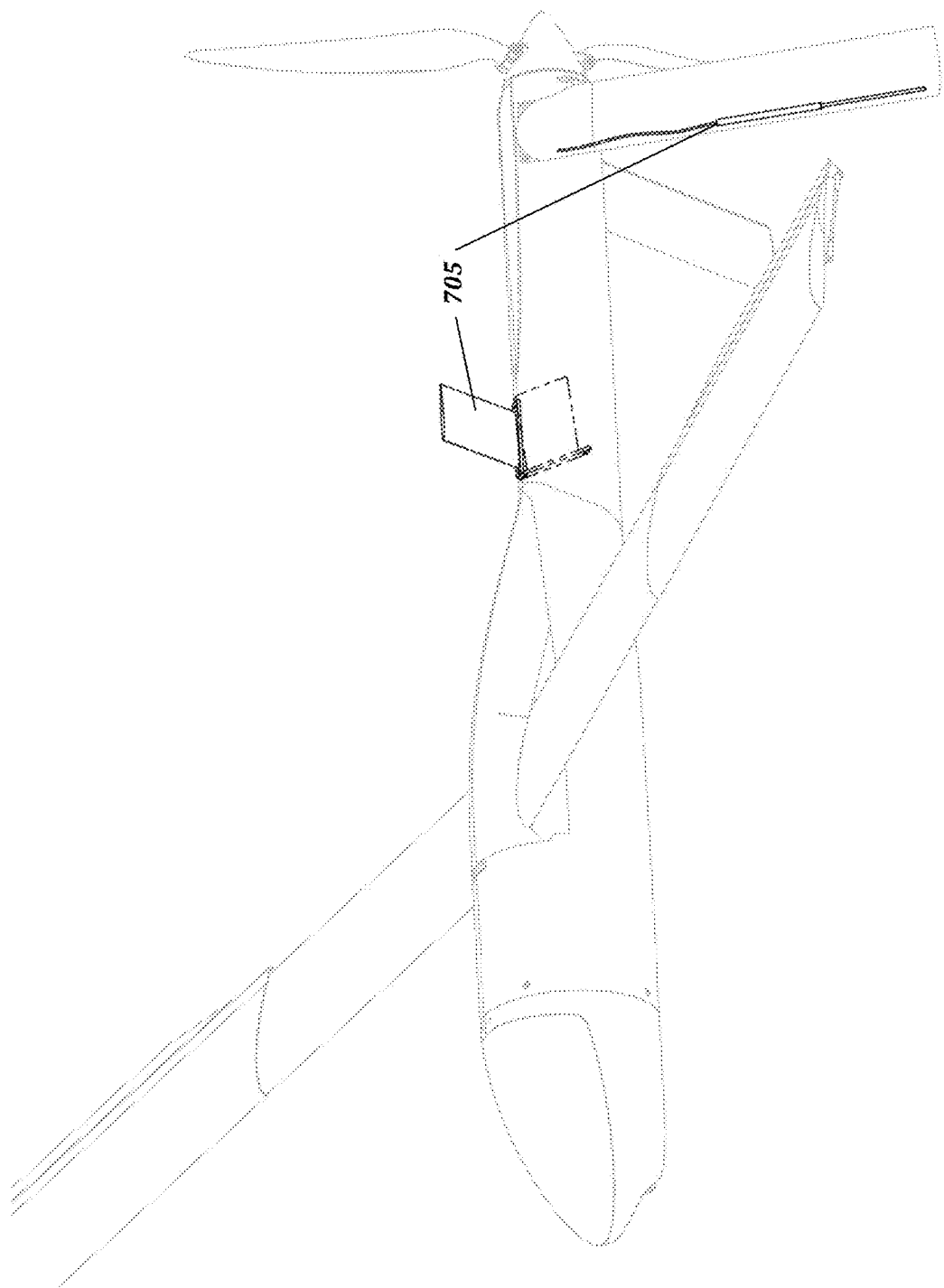
FIG. 7 illustrates potential positions for an antenna.

Referring now to FIG. 7, antenna 705 may be positioned in various portions of the UAVDC. For example, antenna 705 may be fixed, and, in some embodiments, may be conformal (i.e., built into the skin of fuselage 106). Alternatively, antenna 705 may be deployable. For example, antenna 705 may be configured to deploy out from the fuselage (e.g., via a spring) on a hinge. As another example, as illustrated in FIG. 7, antenna 705 may be built into at least one of stabilizers 125. In this way, when stabilizers 125 are deployed, antenna 705 may also be deployed. In further embodiments, and as illustrated in FIGS. 6D and 6E, modular payload 140 may be embodied as antenna 705. In this way, antenna 705 may be attached to boom 655 and configured to extend from fuselage 106. In yet further embodiments, a plurality of antennas may be integrated within the UAVDC.

Antenna 705 may be in operable communication with an on-board controller, as further detailed with reference to FIG. 15. In this way, antenna 705 may both send and receive data to and from a remote location (e.g., a UAVDC operator). For example, antenna 705 may be used to receive control signals from a remotely-located operator. The control signals may be processed and decrypted by the on-board controller, which, in turn, may operate the UAVDC accordingly. Furthermore, the antenna 705 may be used to communicate various data from the UAVDC to, for example, the remotely located operator.

Data may include, but not be limited to, for example, sensor data collected by various sensors on-board the UAVDC (e.g., sensors within modular payload 140). In yet further embodiments, the data may include telemetric data for the UAVDC, including, but not limited to, for example, global positioning data, accelerometer data, gyroscopic data, velocity data, and the like. In some embodiments, the aforementioned data may be collected, processed, and encrypted by the on-board controller prior to its communication.

Figure 8:
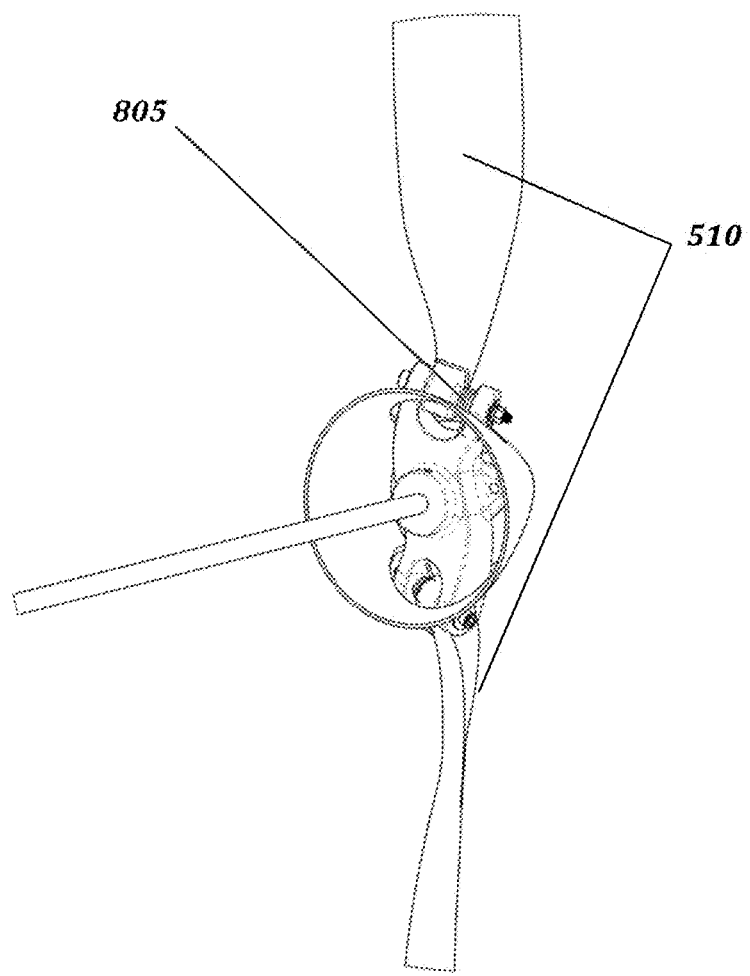
FIG. 8 illustrates a propeller and associated components.

It should be understood that the UAVDC may be configured with various propulsion mechanisms, and that propeller 135 illustrated in FIG. 8 is just one illustrated variation. Other propulsion mechanisms may include, but are not limited to, rockets, jet engines and compressed gas jets. Moreover, in some embodiments, no propulsion may be required at all, as the UAVDC may have characteristics of a glider. In such embodiments, the UAVDC may be launched from, for example, a tube or released from, for example, an airplane within gliding range of its mission target. The various properties of the UAVDC, as described in various embodiments herein, may provide the UAVDC with sufficient flight time (upon, for example, deployment as detailed below with reference to FIG. 14) to accomplish its mission without requiring additional propulsion.

Figure 9:
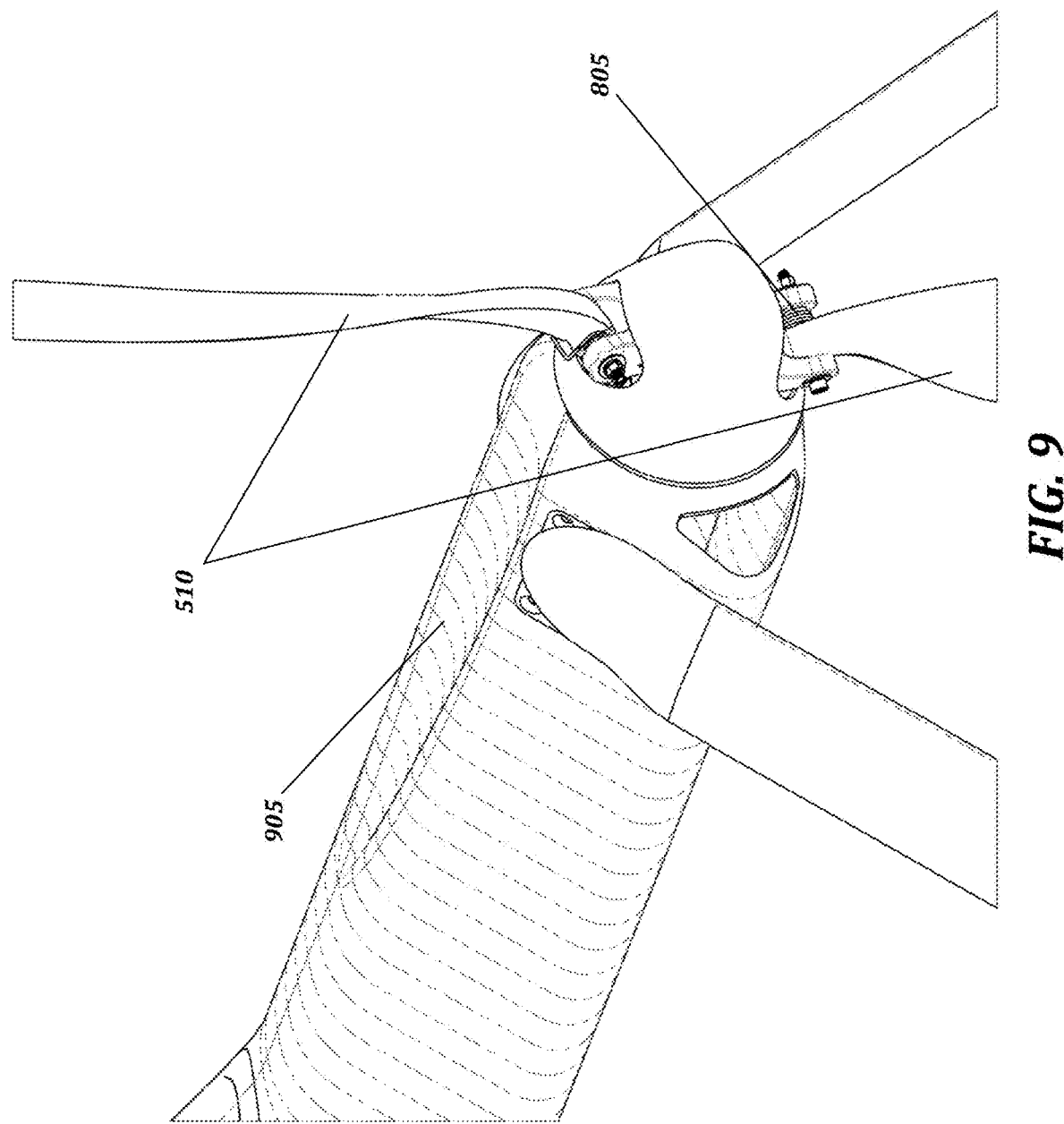
FIG. 9 illustrates grooves in the fuselage configured to receive propeller blades in a folded configuration.

Propeller 135 may comprise propeller blades 510 that fold against fuselage 106. While propeller 135 is shown as having two propeller blades 510, it should be understood that more or fewer propeller blades may be utilized. For example, only a single propeller blade may be used. As illustrated in FIG. 9, fuselage 106 may comprise grooves 905 configured to receive propeller blades 510 in a folded configuration. During flight, propeller 135 may be unfolded by means of, for example, air pressure (e.g. due to drag) against the propeller or centripetal force from rotation of propeller 135. In other embodiments, propeller 135 may be unfolded by using springs (e.g., torsion springs 805) to enable rapid deployment, thus preventing propeller blades 510 from hitting the stabilizers 125 before propeller 135 is completely unfolded.

Although many of the figures illustrate propeller 135 in a rear-mounted position, it should be understood that, in embodiments where a propulsion mechanism is provided, propeller 135 may be configured at different positions of the UAVDC. For example, in some embodiments, propeller 135 may mount to the front of the UAVDC instead of the rear. FIGS. 6D and 6E illustrate an embodiment of a UAVDC comprising a tractor propeller 675 mounting to the front of the UAVDC.

Moreover, the positioning of propeller 135 may be impacted by the deployment of wings 110. Referring to FIG. 10A, propeller blade 1005 is mounted to fuselage 106, trapped beneath wings 110. During a launch of the UAVDC in the first configuration, air drag or springs 805 may force propeller blade 1005 in the top position (e.g., mounted to the top of fuselage 106) towards its deployed state. Such deployment of propeller blade 1005, however, may be obstructed by wings 110 stowed immediately above, as illustrated in the first configuration.

The remaining propeller blade 1010 not obstructed by wings 110 may not be impeded from deployment, and therefore may deploy into the second configuration as designed. In order to prevent damage from the tendency of the remaining propeller blade 1010 to windmill while the propeller blade 1005 is still trapped, the hinge travel 1015 of the blades may be extended to allow blade 1010 to fold back to a position 1020 that aligns blade 1010 with the free stream as shown in FIG. 10B.

Referring back to FIG. 1A, the UAVDC may have a wing arrangement comprised of a single wing with two wing sections. The wing arrangement may be segmented in a left wing section and a right wing section to enable variable sweep at approximately a lateral plane of symmetry between the left wing section and the right wing section. In some embodiments, the wing sections may be a left wing and a right wing (e.g., wings 110). Still consistent with embodiments of the present disclosure, however, the wing arrangement may be a single wing comprised of the two wing sections.

The wing arrangement being configurable in a first arrangement (e.g., corresponding to the first configuration of the UAVDC), a second arrangement (e.g., corresponding to the second or third configuration of the UAVDC), and a third arrangement. In the first arrangement, the left wing section and the right wing section may be stowed against the fuselage at a first sweep deployment angle. In the second arrangement, the wing arrangement may be fully deployed for flight at a second sweep deployment angle. A third arrangement may comprise the wing sections at any wing deployment angle in between the first sweep deployment angle and the second sweep deployment angle.

To enable the sweep deployment angle, the UAVDC may comprise a sweeping gearbox configured to pivot the left wing section and the right wing section to enable the wing arrangement to sweep from the first arrangement to the second arrangement at any sweep deployment angle. The UAVDC may comprise an actuator coupled to the sweeping gearbox configured to actuate the sweeping of the wing arrangement at any sweep deployment angle.

Throughout the sweeping motion, fairing 130 may be configured to change from an open configuration to a closed configuration. Fairing 130 may begin in an open configuration by flexing to allow the first wing section and the second wing section to be stowed under the fairing in the first arrangement, and move to a closed configuration to provide aerodynamic and/or environmental advantages in the second arrangement.

The wings 110 may be stowed in a launch configuration as shown in first configuration 102. In some embodiments, the launch configuration of wings 110 may comprise a vertical offset. Wings 110 may be swept to a flight configuration by sweeping gearbox 205 (e.g., a sweeping means). For example, actuator 210 attached to sweeping gearbox 205 may comprise a worm gear 220 coupled to each wing and a worm 225 coupled to worm gears 220 and configured to spread the wings in sweeping motion 250. Sweeping gearbox 205 may sit on wing mount 215. Various other means may be used in sweeping wings 110, including, but not limited to, springs. In some embodiments, wings 110 may not need to be fully swept in order to enable flight. For example, the UAVDC may be capable of flight at an angle less than full sweep.

Figure 2D:
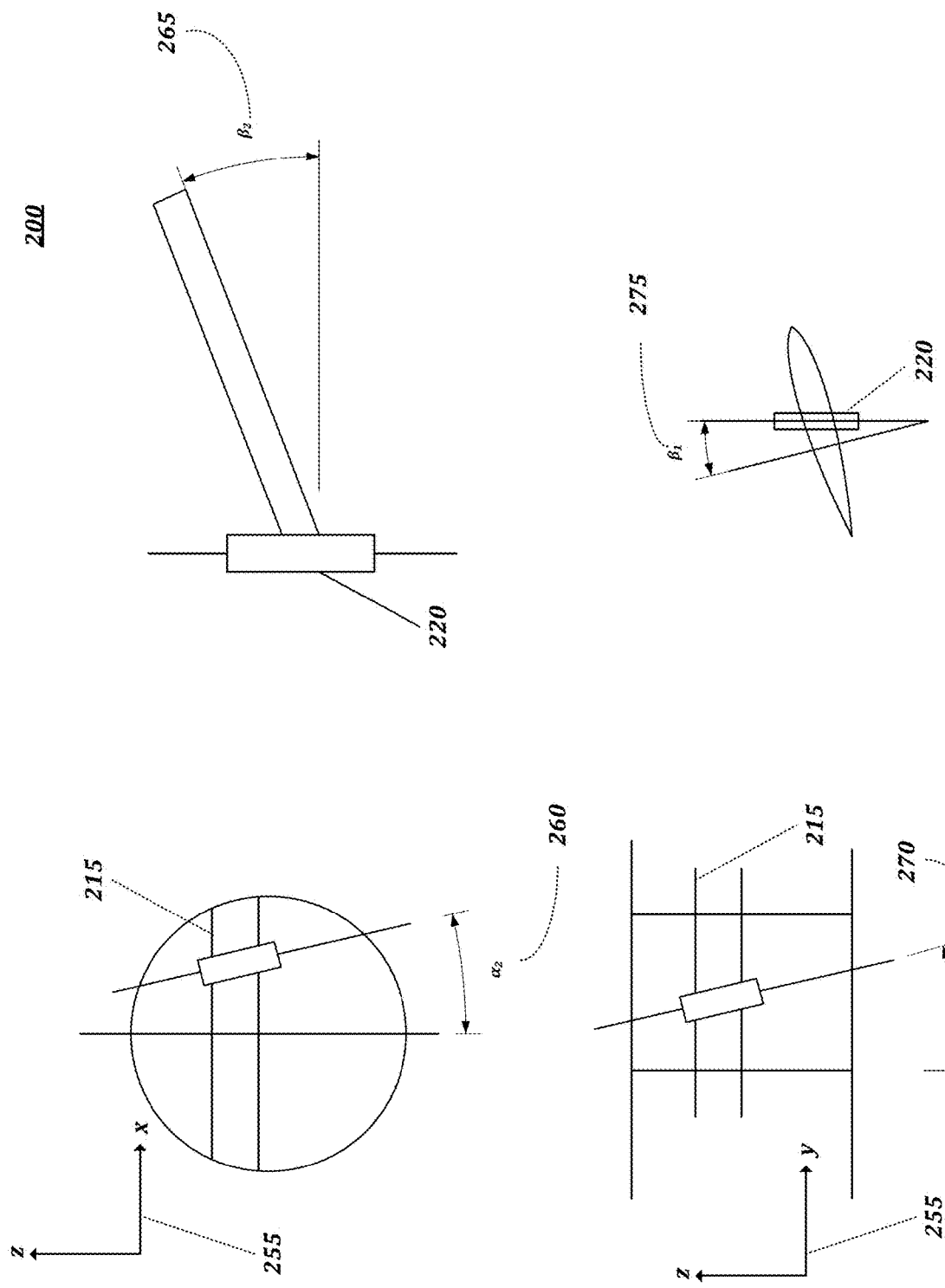
FIG. 2D illustrates a set of schematic drawings for enabling the sweeping gearbox to allow wings to have dihedral and incidence when deployed and to lay flat while stowed.

Gearbox 205 may be configured such that wings 110 may be stored in the launch configuration with a first set of angles with respect to each other (e.g., flat with respect to each other) and with respect to the fuselage (e.g., flat with respect to the fuselage). Gearbox 205 may further be configured to cause wings 110 to be deployed with optimal incidence angles and dihedral angles in the swept configuration. This may be achieved by orienting each wing's axis of rotation as well as each wing's attachment to worm gear 220 (or "wing pivot"). As such, gearbox 205 may comprise two pivot axes around which the wings may sweep. FIG. 2D illustrates a schematic for illustrating geometry to enable a gearbox 205. For example, the axis of rotation may be oriented such that its angle in the Y-Z plane 270, as shown in reference to axes 255, may match an angle of attachment 265 to worm gear 220. Further the angle in the X-Z plane 260 may match an angle of attachment 275 to worm gear 220. With this configuration, wings 110 may be stowed flat with respect to each other and with respect to the fuselage, while deployed with optimal dihedral and incidence angles. The optimal dihedral angle may be the combination of the angle in the X-Z plane 260 and the angle of attachment 265; the optimal angle of incidence may be the combination of the angle in the X-Y plane and the angle of attachment 275. In this way, a single mechanism may both sweep wings 110 and orient wings 110 to desired dihedral angles and angles of incidence. The single mechanism for sweeping and orienting wings may reduce weight and complexity, thus increasing endurance and decreasing cost.

The UAVDC may comprise fairing 130 to reduce drag while enabling the outward sweeping motion 250 of wings 110. FIGS. 11A and 11B illustrate fairing 130 in a first configuration 1105 and a second configuration 1110, respectively. Fairing 130 may be made of a flexible material (e.g., fiberglass) such that it may bend out of the way as wings 110 sweep. In various embodiments, other materials may be used, including, but not limited to carbon fiber, Kevlar, and sheet metal. Fairing 130 may comprise wing hole cutouts 1115 to fit around wings 110's profile as wings 110 reach second configuration 1110.

As illustrated in FIG. 11A, fairing 130 in first configuration 1105 may be resting upon the sweeping wings 110 in compact arrangement 102 and undergoing tension from being held in a strained ("buckled") state. Slits 1120 may be implemented in fairing 130 to enable fairing 130 to flex adequately to accommodate sweeping wings 110 in compact arrangement 102. Upon the UAVDC entering second configuration (e.g., expanded arrangement 105), fairing 130 may flex as illustrated in FIG. 11B to close around the wing as wings 110 reach wing hole cutouts 1115. In second configuration 1110, fairing 130 may be in an unstrained state as it securely fits around wing 110 to minimize drag. If fairing 130 comprises a fibrous composite material, it may be desirable to use a fiber orientation to facilitate buckling and flexibility in the laminate (e.g. using +/−45 degree plies may exhibit greater flexibility and buckle easily in 0 and 90 degree directions).

Figure 11C:
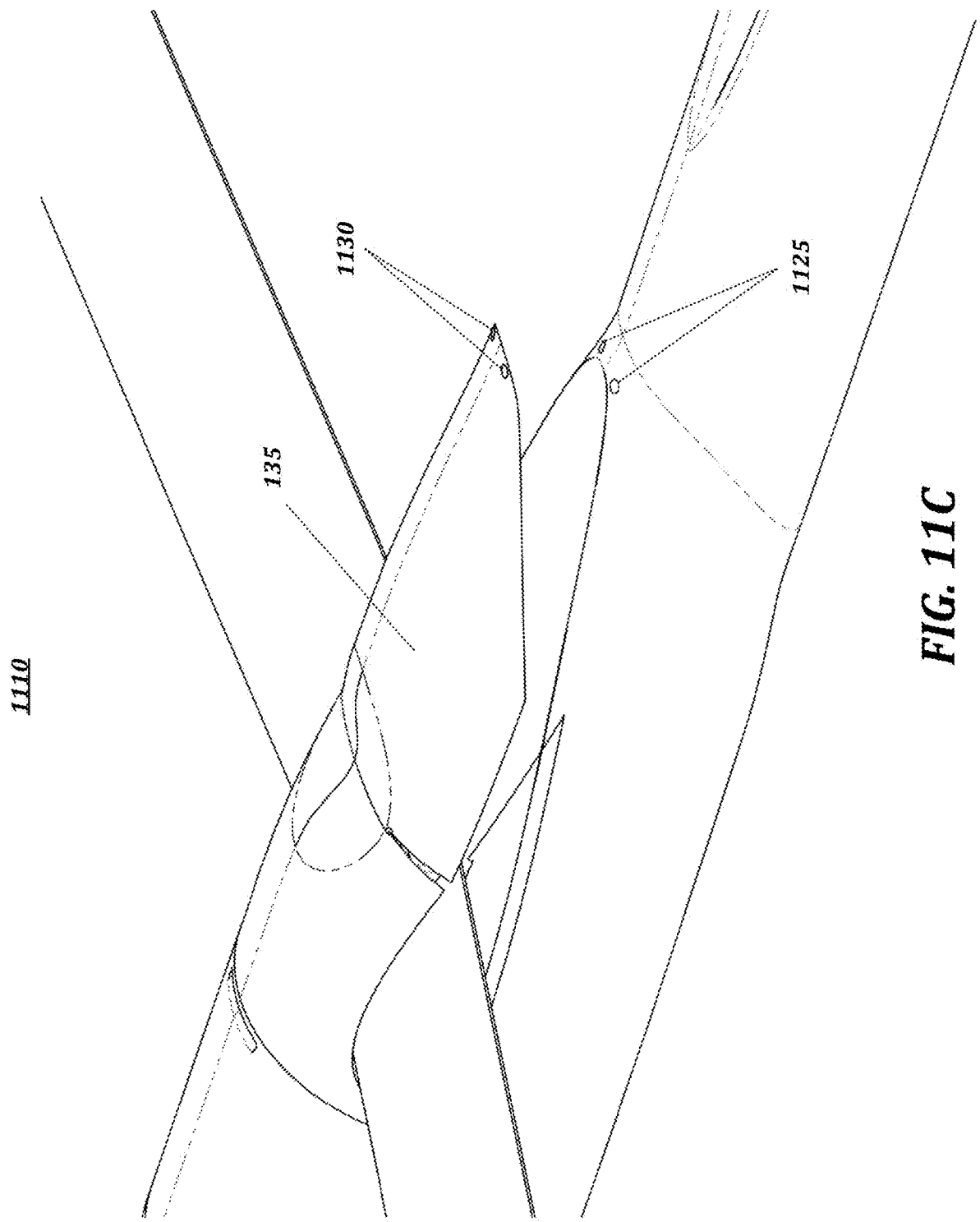
FIG. 11C illustrates the fairing comprising magnets.

In further embodiments, magnets 1125 may be employed to further lock fairing 130 around the swept wings 110, as shown in FIG. 11C. Magnets 1125 may be located on fuselage 106. Magnets of opposite polarity or a magnetic metal 1130 may be on fairing 130 to receive magnets 1125's magnetic attraction. In further embodiments, the location of the magnets 1125 and corresponding magnetic metal 1130 may be reversed.

As wings 110 are being swept, or, in some embodiments, after wings 110 have completely been swept, wings 110 may telescope. For example, inner section 305 may attach to fuselage 106 of the UAVDC. Inner section 305 may be stowed at least partially within outer section 310 during the compact first configuration. Outer section 310 may comprise a substantially hollow interior. An exterior surface of interior section 305 may be stowed against and interior surface of the exterior section 310. To reach the second configuration, outer section 310 may slide along inner section 305 to extend outwards from the fuselage 106. As outer section 310 slides along inner section 305, an increasing portion of inner section 305 may be exposed. The wingspan of wings 110 may be approximately the length of outer section 310 and the exposed portion of interior section 305. Both inner section 305 and outer section 310 may employ an aerodynamic profile to provide lift during flight. Some embodiments may utilize belt system 315 for telescoping wings 110.

Belt system 315 may comprise belt pulleys 325, which may attach to the inner wing section 305 ("second section"). At least one pulley 325 may be driven by an actuator 320. In further embodiments, a plurality of pulleys 325 may be driven by a plurality of actuators 320. Belt 330 may loop around pulleys 325. Notches in belt 330 may enable actuator 320 to move belt 330. One of the straight lengths 331 of belt 330 may be contained within the inner wing section 305, while the other length 332 of belt 330 may be contained in a groove on the bottom of the inner wing section 305 ("second section") that is exposed to the outer wing section 310 ("first section") prior to the telescoping of wings 110.

To enable telescoping, belt 330 may be attached to at least a portion of outer wing section 310 along length 332. In this way, actuator 320's rotation not only causes a movement of belt 330 but also a displacement of outer wing section 310 due to its attachment to belt 330. Accordingly, actuation in direction 335 would cause section 310 to be extended outward from the fuselage 106, thereby increasing the wingspan of the UAVDC. As outer section 310 travels outward, inner section 305 is simultaneously withdrawn from the interior of outer section 310, increasing the wingspan of the UAVDC. Accordingly, as wings 110 are telescoped, length 332 may become exposed but the groove may prevent the belt 330 from protruding from the bottom of the exposed inner wing section 305.

Attaching outer section 310 to length 332 may be implemented by, for example, but not limited to, a clamp, screw or adhesive. In some embodiments, belt 330 may comprise a length of fiber-reinforced rubber material. By stripping rubber from each end of the belt to expose fibers, further attachment mechanisms for attaching belt 330 to outer section 310 may be available. For example, the exposed fibers may be tied to the outer wing section 310 (e.g., to holes in outer wing section 310). The tied fibers may further be secured, for example, with an adhesive. In this way, ends of belt 330 may be attached to create a connected loop without the use of a coupler clamping the ends, thereby eliminating bulky parts commonly used in the art.

Consistent with embodiments of the present disclosure, belt system 315 may provide a lighter and/or a more compact mechanism for telescoping over conventional telescoping systems. In some embodiments, the telescoping of the wings may be reversed by reversing direction 335 of actuator 320 to retract wings 110. In further embodiments consistent with the present disclosure, components of belt system 315 may be reversed, such that outer wing section 310 may be affixed to fuselage 106 and inner wing section 305 may be telescoped outward. In yet further embodiments, a similar belt system may be implemented for extending a boom from fuselage 106. For example, instead of attaching belt 330 to outer wing section 310, belt 330 may attach to the boom.

Wings 110 may comprise ailerons 120. In some embodiments, ailerons 120 may be attached via a hinge 1215 to the trailing edge of outer section 310. In this way, ailerons 120 may minimize interference with outer section 310's internal volume as compared to conventional ailerons. By optimizing outer section 310's internal volume, inner section 305 may have an optimized profile and an increased span that would otherwise be limited by the more commonly-used ailerons. For example, inner section 305 may, when stowed within the first compact configuration, overlap at least a portion of the length of the trailing edge aileron attachment to outer section 310. In this way, a ratio of the surface area between the inner section 305 and outer section 310 may be increased. Maximizing wing span can significantly increase airframe efficiency, flight endurance, and payload capacity. Hinge types that may enable such trailing edge ailerons 120 include, but are not limited to, a living hinge, or other flexure bearing.

Figure 12A:
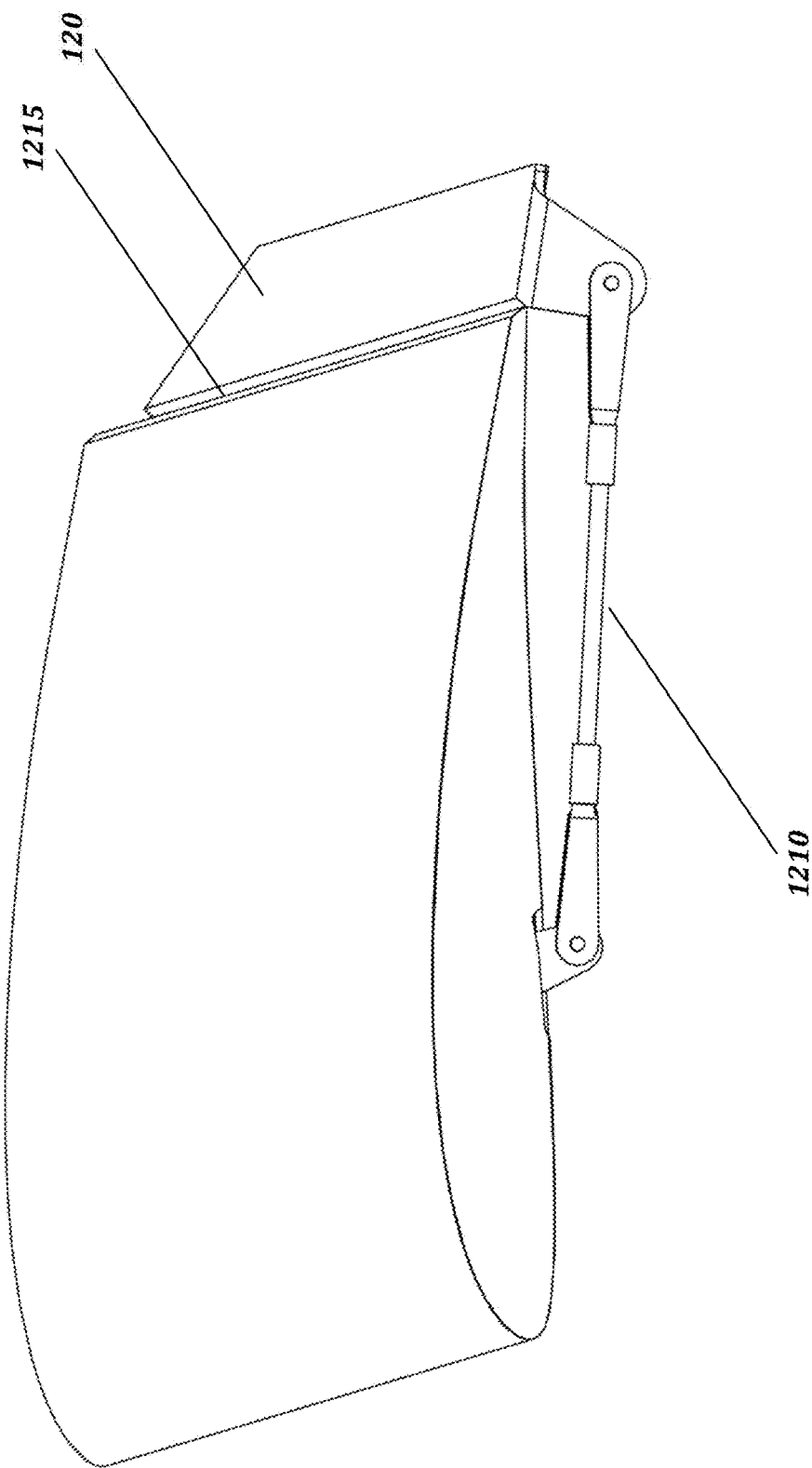
FIG. 12A illustrates components for controlling ailerons.
Figure 13:
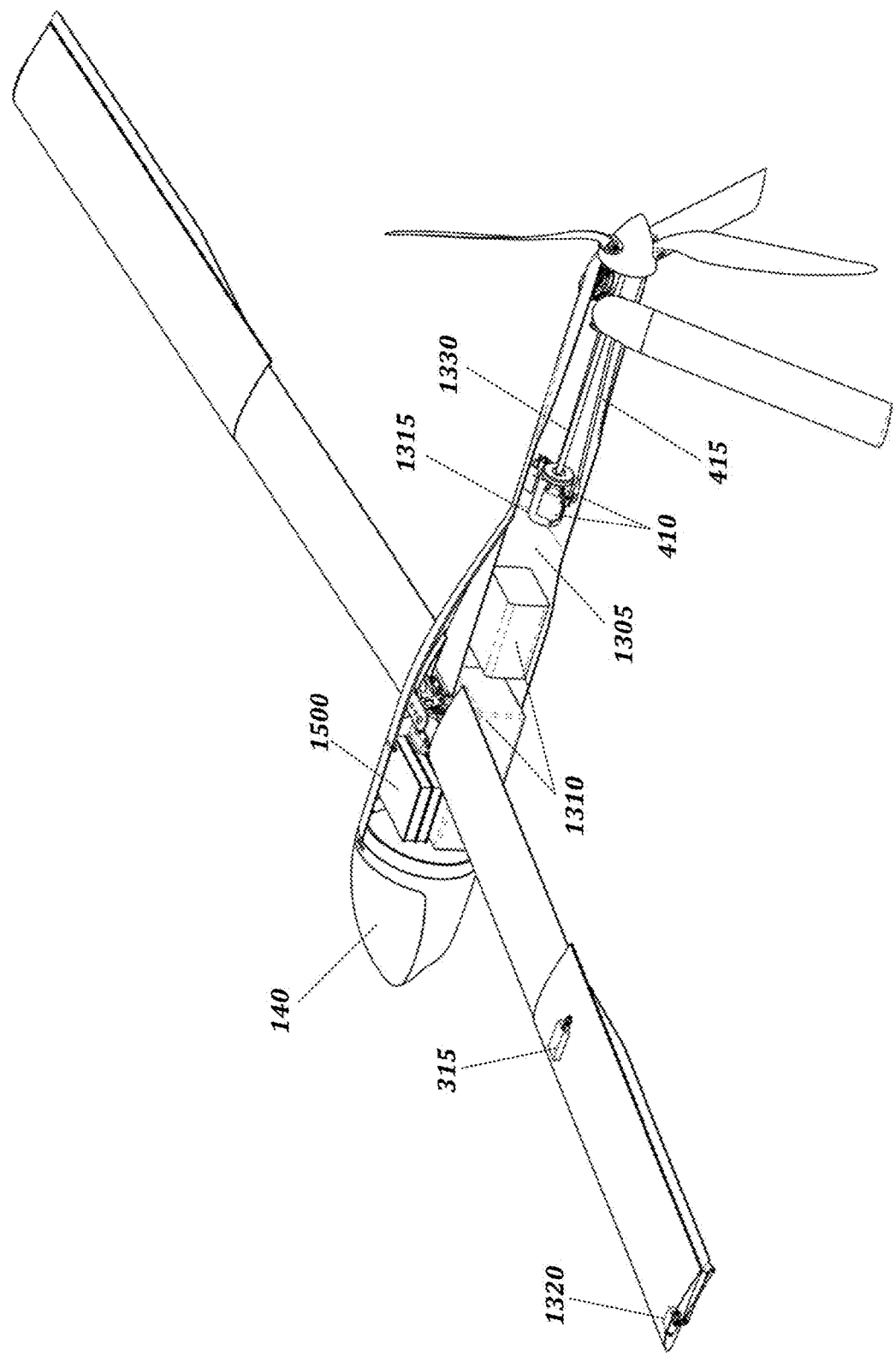
FIG. 13 illustrates one example of an internal configuration of the UAVDC.

Further, by mounting ailerons 120 to the outer section 310 extending away from fuselage 106, ailerons 120 may enable roll control throughout the wing deployment phase. This means the UAVDC may be flown with positive roll control regardless of outer section 310's position relative to inner section 305, which can be beneficial during launch and flight recovery phases where transition to stable flight can be carried out with lower structural loads on the air frame when the wings are configured in their non-telescoped position. This may also be beneficial as the span may be reduced or increased in flight, to maximize aerodynamic efficiency without losing roll control. FIG. 12A shows a configuration of components for controlling the ailerons. Each aileron 120 may be positioned by a servo 1320, as illustrated in FIG. 13, through a linkage 1210. Each servo 1320 may, in some embodiments, be positioned within outer wing section 310. In further embodiments, ailerons 120 may be operated by other means, including, but not limited to, gears or shafts. Each servo 1320 may be controlled by controller 1500

FIG. 12B illustrates possible configurations for ailerons 120, including, but not limited to, a tucked position 1230, which minimizes stowed volume, a partially folded position 1235, and a fully deployed position 1240. Servo 1320 may be operated through a control wire positioned within outer wing section 310 and inner wing section 305. The control wire may extend from fuselage 106 via inner wing section 305. An end of wing section 305 may comprise an opening through which the control wire may extend into the interior of outer wing section 310, connecting to servo 1320. In various embodiments, the wire may comprise sufficient length to accommodate the telescoping of the wings. While the wings are not telescoped, the control wire may be spooled or neatly folded within either of the wing sections.

FIGS. 4A-4D illustrate an embodiment of a deployable pivoting control surface embodied as a stabilizer 125. While this disclosure uses the term "stabilizers" in reference to deployable pivoting and/or pitching control surfaces, it should be understood that such controls surfaces may not be limited to stabilizers. For example, deployable pivoting control surfaces implementing the same components may be used in other ways, including, but not limited to, wings.

In some embodiments, stabilizers 125 may be moved into the flight configuration by other means, including, but not limited to, air drag. In further embodiments, stabilizers 125 may be spring-loaded such that they move into the flight configuration upon launch. For example, torsion springs 405 may move stabilizers 125 into the flight configuration. Stabilizers 125 may be used to provide flight control by servos 410 operating push rods 415 and control horns 416 which pivot the stabilizer about axis 425. For example, servos 410 may cause stabilizers 125 to rotate around axis 425 by pivoting within hinge 420. Further, stabilizers 125 may comprise fairings 485. Fairings 485 may be embodied as a flexible material (e.g. a rubber or elastomer) configured to go around shaft 445 for enabling a pitching motion while maintaining aerodynamic efficiency as shown in FIGS. 4E through 4G. As stated above, stabilizers 125 may comprise one or more antennas 705 such that deployment of stabilizers 125 may further deploy one or more antennas 705.

Stabilizers 125 may move into the flight configuration by pivoting around axis 430. In this way, axis 430 may be constant relative to fuselage 106 in transition from first configuration 450 to second configuration 455. Further, by aligning control horn 416's centerline with axis 430 during deployment, servos 410 need not move during transition 440 from first configuration 450 to second configuration 455, as further shown in FIGS. 4A and 4B.

Servos 410 may be configured to move push rods 415 coupled to control horns 416 on the at least one stabilizer for deflecting/rotating the at least one stabilizer about its spanwise axis. Control horns 416, in turn, may be configured to remain in a relatively fixed position as the at least one stabilizer deploys into flight configuration (the second configuration).

FIGS. 4E-4G illustrate a stabilizer fairing 485. Stabilizer fairing 485 may be used to cover the various components that enable the least one stabilizer to be deflected/rotated about its spanwise axis to provide positive flight control while in the second stabilizer configuration 455. Stabilizer fairing 485 may comprise a flexible material, such as, for example, rubber. As such, stabilizer fairing 485 may reduce drag on various components, including, but not limited to, shaft 445, while flexing to enable the full range of motion of stabilizer 125.

A number of internal components may be mounted within an interior 1305 of fuselage 106. FIG. 13 illustrates one example of internal configuration of the UAVDC in which a power source 1310 may be positioned within the interior of fuselage 106. Power source 1310 may comprise, for example, a fuel tank or one or more batteries. Various components of the UAVDC may be connected to power source 1310, including, but not limited to, modular payload 140, controller 1500, sweeping gearbox actuator 210, control mechanisms for ailerons (e.g., servos 1320), servos 410 for stabilizers 125, a motor 1315 to drive the propeller 135, and antenna 705. Embodiments of the UAVDC comprising a propulsion device (e.g., propeller 135) may be powered by alternative power sources, such as, for example, an internal combustion engine. In such embodiments, a fuel source for the internal combustion engine (e.g., gas tank) may be positioned within interior 1305 of fuselage 106.

Internal components may further include, for example, but not be limited to, the following components, which will be further detailed with reference to section III below, sweeping gearbox 205 and actuator 210 employed to sweep wings 110; control mechanisms for ailerons 120 (e.g., servos 1320) for operating ailerons 120 and servos 410 for operating stabilizers 125); a motor 1315 for driving propeller 135; driveshaft 1330 for coupling motor 1315 to propeller 135 and an on-board controller 1500 for controlling the deployment, flight, and operation of the UAVDC. The illustrated configuration of internal components is just one possible configuration, and other embodiments are possible. The interior components may be distributed to balance the weight in an optimal way for flight.

III. OPERATION

Figure 14:
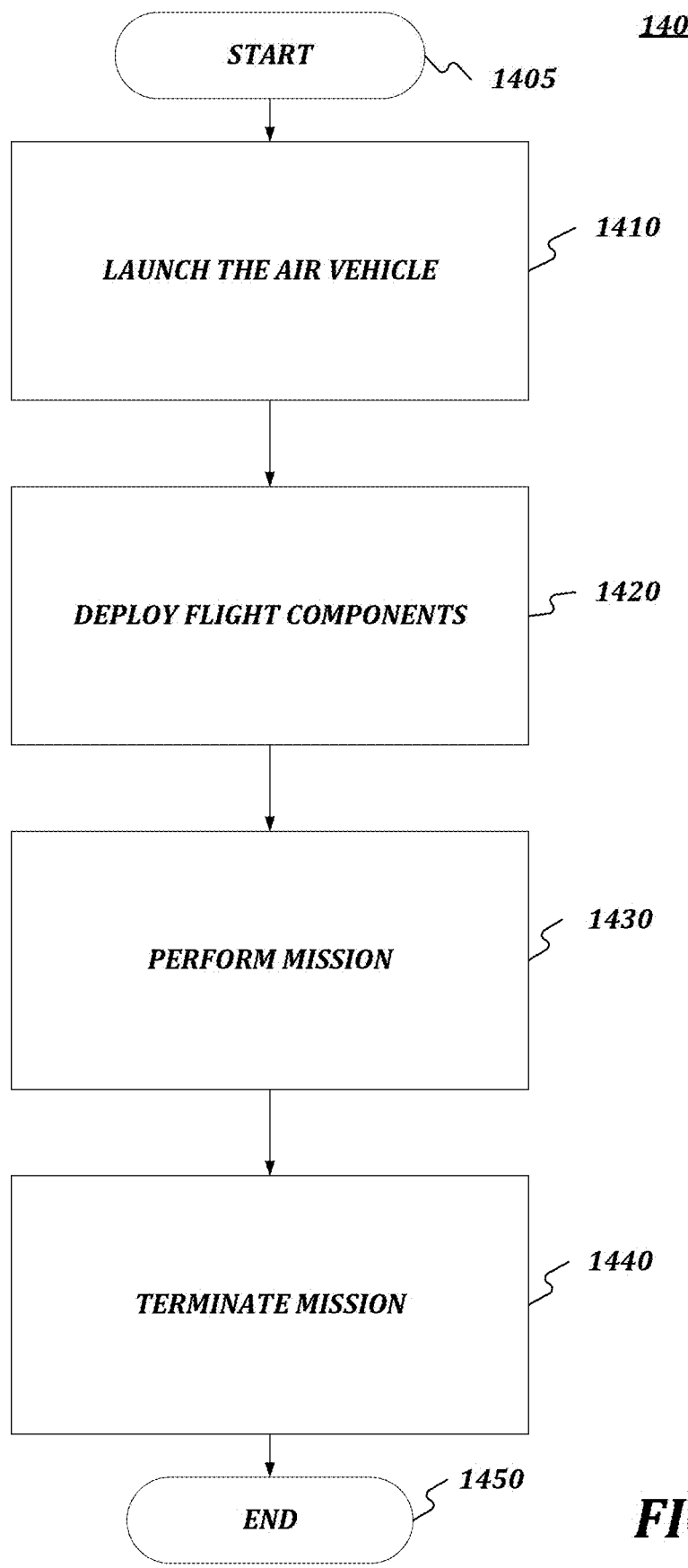
FIG. 14 illustrates a method for using the unmanned aerial vehicle with deployable components.

FIG. 14 is a flow chart setting forth the general stages involved in a method 1400 consistent with an embodiment of the disclosure for operating the UAVDC. Method 1400 may be implemented using, at least in part, a controller 1500 (e.g., on board computing device) as described in more detail below with respect to FIG. 15. Controller 1500 may comprise a controller for operating the deployable components as well as well as performing other mission details, including, but not limited to, flight control, payload operation, and communication. As such, controller 1500 may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, inertial measurement unit, global positioning system, various telemetry sensors, and antenna 705, as well as all other units. As will be detailed with reference to FIG. 15, controller 1500 may comprise a remote communication module to enable remotely operation as described above with reference to antenna 705. In other embodiments, controller 1500 may be completely self-operating upon configuration. In this way, the UAVDC may be self-piloting.

Furthermore, although stages are disclosed with reference to controller 1500, it should be understood that a plurality of other components may enable the operation of method 1400, including, but not limited to, other computing components, mechanical components, environment properties (e.g., air resistance), remote operators, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1400 may begin at starting block 1405 and proceed to stage 1410, where the UAVDC may be launched. For example, the UAVDC may be fired from a tube launched from a craft or dropped from a carrier aerial vehicle. The compact arrangement 102 of the UAVDC's first configuration (as specified, for example, with reference to FIG. 1A) may enable the UAVDC to be tube-launched as, for example, a missile. In some embodiments, once dropped from a carrier aerial vehicle, the UAVDC may be aerodynamically designed (as illustrated) and with such a weight distribution that it may self-orient from a tumbling drop into a dive.

From stage 1410, where the UAVDC is launched, method 1400 may proceed to stage 1420 where the flight components may be deployed. The deployment of flight components, though disclosed in a particular order for illustrative purposes, may occur in other arrangements.

Upon launch, the stabilizers 125 and propeller 135 may deploy. In applicable embodiments, springs 405 and springs 805, may deploy stabilizers 125 and propeller blades 510, respectively. In other embodiments, the air resistance at launch and the stowed arrangement of stabilizers 125 (e.g., first stabilizer configuration 450) and propeller blades 510 create a force in a vector of expansion, thereby causing stabilizers 125 and propeller blades 510 to deploy in a deployed arrangement (e.g., second stabilizer configuration 455).

Controller 1500 (e.g., on-board computing-device) may automatically engage actuators and the wing deployment mechanisms instantly or after a set amount of time has passed since the launch. In other embodiments, engagement may occur upon certain reading from on-board sensors (e.g., including, but not limited to, sensors deployed in modular payload 140). For example, wing deployment and extension may be dependent on certain in-flight factors such as, for example, velocity, acceleration, and leveling of the UAVDC. Controller 1500 may be configured to trigger deployment of various components upon the satisfaction of certain pre-set conditions. Such conditions may be defined prior to deployment.

Actuator 210 may drive sweeping gearbox 205 to sweep wings 110. In some embodiments, the UAVDC may be capable of controlling sustained flight once wings 110 sweep out 45 degrees. As wings 110 reach full sweep, wings 110 may move within wing hole cutouts 1115 of fairing 130, which has opened due to the strain of the sweeping motion 250, and relocked with the aid of magnets positioned within the fuselage. Accordingly, fairing 130 may automatically snap shut around the profile of wings 110 to improve aerodynamics. Magnets 1125 may further lock fairing 130 around wings 110.

As wings 110 begin sweeping, or after wings 110 are fully swept, wings 110 may begin telescoping. For example, belt system 315 may pull outer section 310 along inner section 305 to telescope wings 110. The wing sweep angles and telescoped positions may further be dynamically adjusted in flight.

Further, in embodiments where deployable, modular payload 140 may deploy from its first arrangement to its second arrangement. For example, modular payload 140 may comprise a plurality of sensing devices better situated for performance at a deployed position (e.g., an extended boom). Such deployment may occur upon the post-launch stabilization segment of the UAVDC's flight.

From stage 1420, where the flight components are deployed and UAVDC flight is stabilized, method 1400 may proceed to stage 1430, where the UAVDC may be used to perform a mission. During all stages of flight, the UAVDC may be in operable communication with an operator via antenna 705. The operator may receive various readings from the various components of the UAVDC.

In some embodiments, the operator may control the operation of the UAVDC during the mission. For example, the operator may be able to control the flight components, including, but not limited to, the wing deployment mechanisms (e.g., sweeping gearbox 205, actuator 210, and belt system 315), propeller 135, stabilizers 125, ailerons 120, and further deployable components (e.g. telescoping boom 710 for antenna 705, and boom 655 for antenna 650). In other embodiments, on-board controller 1500 may be pre-configured with mission control data.

Embodiments of the UAVDC may be used for a plurality of missions including, but not limited to, data capture, payload deployment, and providing a telecommunications relay. In addition to communicating for flight control, embodiments of the UAVDC may be controlled in data capture and transmission. In further embodiments, the UAVDC may enable the operator to release modular payload 140.

From stage 1430, where the UAVDC is used to perform a mission, method 1400 may proceed to stage 1440, where the mission is terminated. For example, the mission may be terminated by flying the UAVDC to a recapture location where it may be recovered. Further, the UAVDC may terminate a mission by crash landing. For example, the UAVDC may be flown into rocks or a hard surface in order to destroy functional components. In further embodiments, the UAVDC may be equipped with an explosive device such that it may be self-destructed upon mission completion. After stage 1440, method 1400 may end at stage 1450.

IV. ON-BOARD SYSTEM ARCHITECTURE

The UAVDC may comprise, but not be limited to, an on-board computing module. The computing module may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, global positioning system, various telemetry sensors, and antenna 705. Further, the computing device may be in operative communication with another computing device consistent with the description herein, and may comprise, but not be limited to, a desktop computer, laptop, a tablet, or mobile telecommunications device. Such remote devices may be used to control and/or configure on-board computing module (e.g., deployment conditions, mission controls, and the like).

Moreover, the UAVDC may be in operative communication with a centralized server, such as, for example, a cloud computing service. Although operation has been described to be performed, in part, by a controller 1500, it should be understood that, in some embodiments, different operations may be performed by different networked elements in operative communication with controller 1500.

Embodiments of the present disclosure may comprise a system having a memory storage and a processing unit. The processing unit may be coupled to the memory storage, wherein the processing unit is configured to perform the stages of method 1400.

Figure 15:
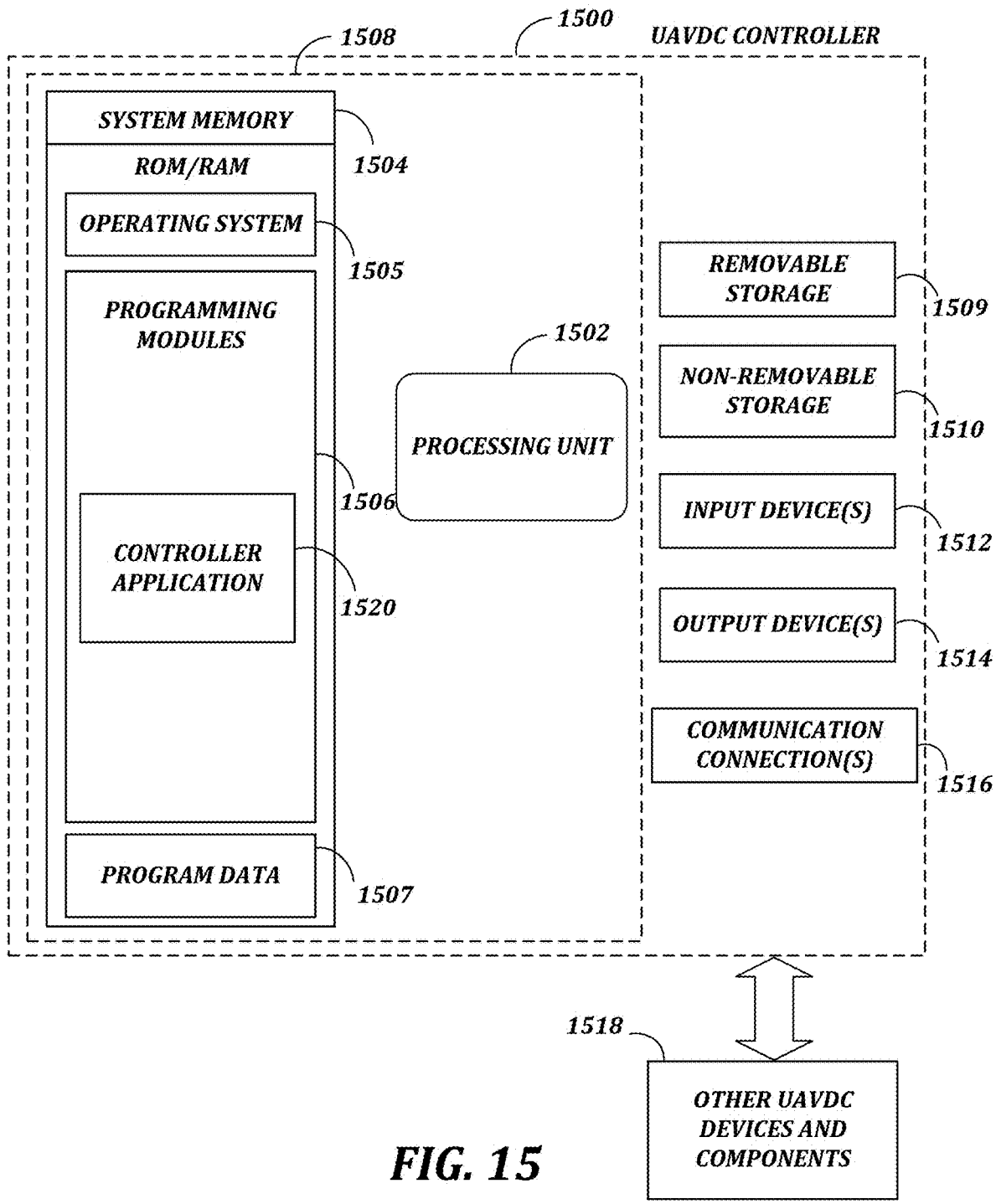
FIG. 15 is a block diagram of a system including a computing device for enabling operation of the apparatus.

FIG. 15 is a block diagram of a system including controller 1500. Consistent with an embodiment of the disclosure, the aforementioned memory storage and processing unit may be implemented in a computing device, such as controller 1500 of FIG. 15. Any suitable combination of hardware, software, or firmware may be used to implement the memory storage and processing unit. For example, the memory storage and processing unit may be implemented with controller 1500 or any of other UAVDC devices and components 1518, in combination with controller 1500.

Other UAVDC devices and components 1518 may comprise, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, global positioning system, various telemetry sensors, and antenna 705. The aforementioned system, device, and processors are examples and other systems, devices, and processors may comprise the aforementioned memory storage and processing unit, consistent with embodiments of the disclosure.

With reference to FIG. 15, a system consistent with an embodiment of the disclosure may include a computing device, such as controller 1500. In a basic configuration, controller 1500 may include at least one processing unit 1502 and a system memory 1504. Depending on the configuration and type of computing device, system memory 1504 may comprise, but is not limited to, volatile (e.g. random access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling controller 1500's operation. In one embodiment, programming modules 1506 may include flight control application 1520. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Controller 1500 may have additional features or functionality. For example, controller 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by controller 1500. Any such computer storage media may be part of device 1500. Controller 1500 may also be operative with input device(s) 1512 such as a keyboard, a mouse, a pen, a sound input device, a touch input device, etc. Input device(s) 1512 may be used to, for example, manually access and program controller 1500. Output device(s) 1514 such as a display, speakers, a printer, etc. may also be included. The aforementioned devices are examples and others may be used.

Controller 1500 may also contain a communication connection 1516 that may allow device 1500 to communicate with other UAVDC devices and components 1518 (e.g., antenna 705), such as over an encrypted network in a distributed computing environment. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., controller application 1520) may perform processes including, for example, one or more of stages or portions of stages of method 1400 as described above. Controller application 1520 may be configured to operate UAVDC devices and components 1518 and receive instructions from, for example, communications connections module 1516. The aforementioned process is an example, and processing unit 1502 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

V. LOCKING BLADE CONFIGURATION

FIGS. 16A-D and 17A-F illustrate various aspects and configurations of a foldable propeller blade 1605 with a locking mechanism 1615. A UAVDC or other aerial vehicle may comprise at least one (e.g. 1, 2, 3, . . . ) foldable propeller blade 1605. A propeller 135 or propeller blade 510, 1005, 1010 may also be, or be referred to as, a foldable propeller blade 1605.

A foldable propeller blade 1605 can have different configurations. In some embodiments, one or more foldable propeller blades 1605 can have a stowed configuration, wherein the outer tips of the one or more foldable propeller blades 1605 may be positioned substantially on, in, or near the fuselage 106, and a deployed configuration, wherein the outer tips of the one or more foldable propeller blades 1605 may be positioned away from the fuselage 106. They may be deployed in this manner in order to rotate in such a way as to provide a thrust or stabilizing effect for the vehicle.

Hinge travel 1630 is depicted in FIGS. 16A-D as a "front-to-back" or "fore-to-aft" arc traced by the outer tip of the foldable propeller blade 1605, wherein the outer tip starts in a stowed configuration close to the fuselage 106 and relatively nearer to the front (or "fore") of the vehicle, and moves to a deployed configuration away from the fuselage 106 and relatively farther from the front of the vehicle—i.e. towards the back (or "aft") of the vehicle. This is one possible configuration consistent with various embodiments, although others are possible, including configurations in which deployment of a foldable propeller blade 1605 causes the outer tip to trace a "back-to-front" or "aft to fore" arc, a helical, spiral or irregular path, a telescoping path (i.e. outward from the fuselage 106), or various combinations thereof.

A foldable propeller blade 1605, when in a stowed configuration, can have a folding arrangement along the thrust axis, which can include straight, angled, curved, helical, arrangements with respect to the fuselage 106 and/or the thrust axis. A stowed configuration can have one or more foldable propeller blades 1605 that are recessed, latched, pinned, retracted (i.e. telescoped inward), etc. with respect to the fuselage 106.

Deployment of a foldable propeller blade 1605 can occur by way of a hinge 1610 (or hinge assembly 1645) that can connect the foldable propeller blade 1605 to the fuselage 106 and allow outward egress (or "hinge travel") 1630 of the foldable propeller blade 1605. Keeping a foldable propeller blade 1605 in a desired deployed configuration can be complicated by forces that may tend to push the foldable propeller blade 1605 back toward the fuselage 106 in a forward folding motion 1620. To counteract such forward folding motion 1620 (and/or for other reasons) a vehicle comprising at least one foldable propeller blade 1605 may further comprise a locking mechanism 1615.

A locking mechanism 1615 may be used to resist forward folding motion 1620 of a foldable propeller blade 1605, keeping the foldable propeller blade 1605 in a deployed configuration. Locking mechanisms 1615 can comprise a diverse array of components and means for preventing motion, including (but not limited to) ramps, clamps, guides, pins, springs, pegs, tabs, latches, clasps, holes, cavities, depressions, indentations, protrusions, systems having threaded members, ratchet mechanisms, hinges, detents, carabiners, hook and loop systems, mechanically interfacing fasteners, expandable or contractable materials, magnets, electromagnetic latching mechanisms, and adhesives.

One or more locking mechanisms 1615 may be employed between a foldable propeller blade 1605 and hub 1625, between either the translating surfaces (in the "radial plane" 1635) or rotating surfaces (in the "axial direction" 1640), or both. The axial direction 1640 can be described, in certain embodiments, as the through direction of a hinge 1610 mechanism about which a foldable propeller blade 1605 can rotate as it moves, e.g., from a stowed configuration to a deployed configuration or vice versa. The radial plane 1635 can be described, in certain embodiments, as the plane in which hinge travel 1630 can occur, or as the plane perpendicular to the axial direction 1640, through which a foldable propeller blade 1605 can trace an arc as it moves, e.g., from a stowed configuration to a deployed configuration or vice versa.

Figure 17A:
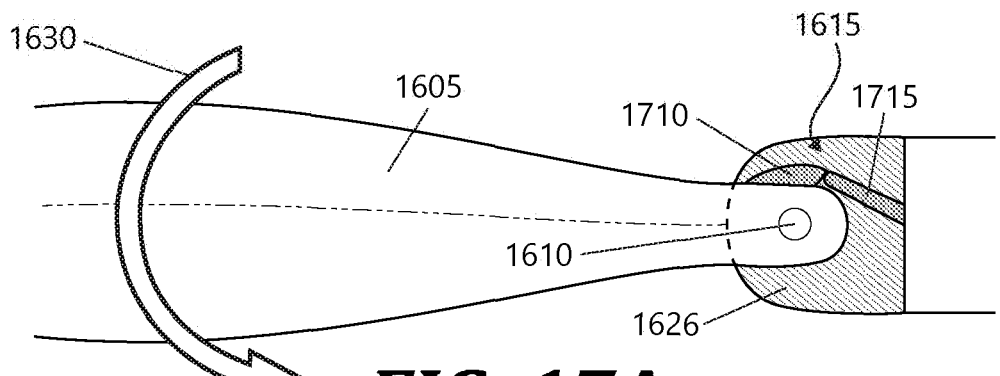
FIG. 17A illustrates an example of a locking mechanism with a tab and ramp configuration.
Figure 17B:
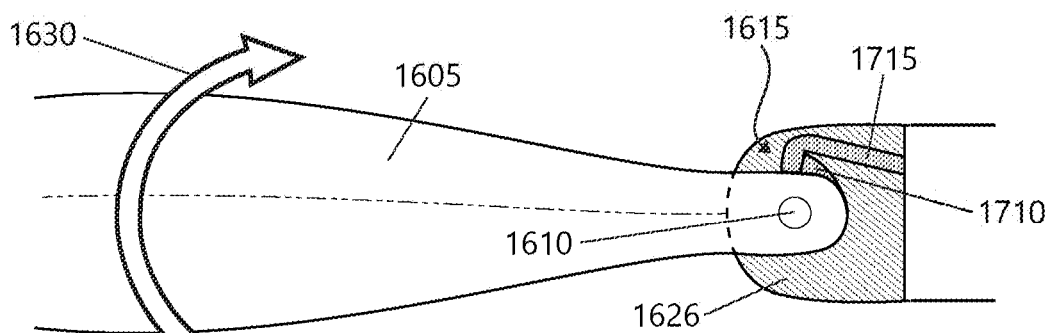
FIG. 17B illustrates another example of a locking mechanism with a tab and ramp configuration.
Figure 17C:
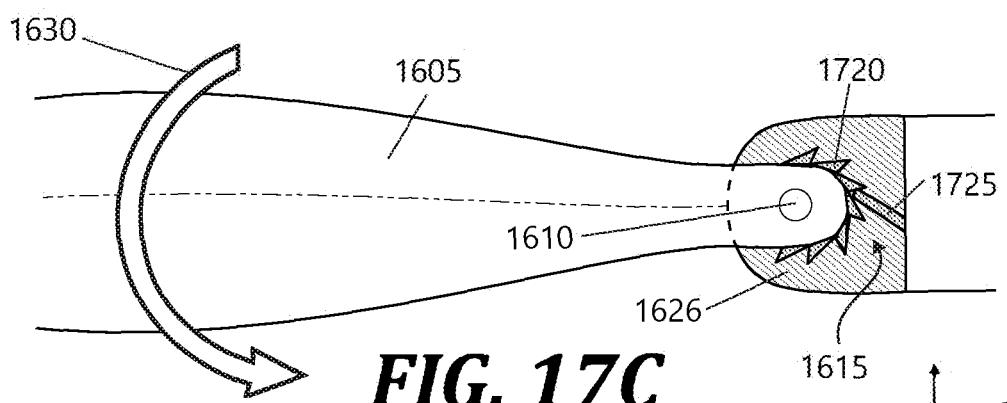
FIG. 17C illustrates an example of a locking mechanism with a ratchet and pawl configuration.
Figure 17D:
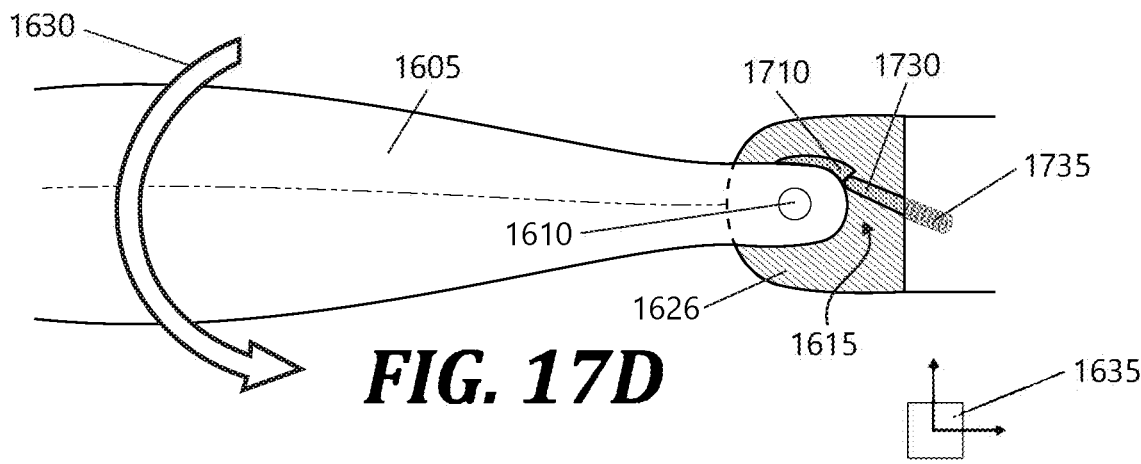
FIG. 17D illustrates an example of a locking mechanism with a spring-pin and ramp configuration.

For example, a locking mechanism 1615 operating in the radial plane 1635 can include a spring-pin 1730 and ramp 1710, as conceptually illustrated in FIG. 17D. For another example, a locking mechanism 1615 operating in the axial direction 1640 can include a spring-pin 1730 and hole 1740, with the direction of spring-pin insertion 1745 being substantially aligned with the axial direction 1640, as conceptually illustrated in FIG. 17F.

In some embodiments, a ramp 1710 (retractable or fixed) and tab 1715 system can force one-way travel of a foldable propeller blade 1605 (e.g. from a stowed to a deployed configuration) and thus act as a locking mechanism 1615. In a manner consistent with depictions in FIGS. 17A, B, and D, a ramp 1710 can be positioned on a foldable propeller blade 1605, on an edge surface in the area of the hinge 1610 or hinge assembly 1645, such that a protruding element such as a tab 1715 (or peg, protrusion, spring-pin 1730, etc.) can travel smoothly along the ramp 1710 as the foldable propeller blade 1605 makes its egress, until the tab 1715 reaches a discontinuity (i.e. edge) point of the ramp 1710, whereupon the contacting end of the tab 1715 can drop into a "stuck" or "jammed" position that can prevent the foldable propeller blade 1605 from rotating back towards its initial position. The foldable propeller blade 1605 can thus be locked into, e.g., a deployed position, even though forces acting on the foldable propeller blade 1605 may tend to push it back toward the position of the stowed configuration.

With respect to the constituent parts of a locking mechanism 1615, there is a plethora of practicable components and means for preventing motion, some of which are listed below. This recitation is not exhaustive, and is merely illustrative of some suitable components and variations thereof.

A "ramp" 1710 can include one or more ramped surfaces, grooves, guides, tabs, indentations, or protrusions. In some embodiments, such features can push or guide one or more foldable propeller blades 1605 into a stowed or deployed configuration.

A "spring" 1735 or "spring mechanism" can include one or more torsion springs, tension springs, compression springs, configurations such as coil, flat, leaf, machined, volute, wave, or other types of springs. A spring mechanism can comprise, and can include components that comprise, any suitable material, including pure and alloyed metals, polymers, ceramic materials, composite materials, and combinations thereof.

An "elastomer component" can include an elastomeric material that can twist, stretch, compress, or otherwise be physically configured to store potential energy that can push or guide a foldable propeller blade 1605 into a folded or deployed configuration.

An "actuator" can include electrical, hydraulic, pneumatic, mechanical, thermal, magnetic, shape memory, and any other suitable type of actuator.

A "ratchet" 1720 and "pawl" 1725 can incorporate, e.g., a tab 1715, spring 1735, hook, or other suitably configured mechanism as the pawl 1725, such that when engaged the ratchet 1720 moves only in one direction.

A "spring-pin" 1730 or "spring-loaded pin" can interface with a hole 1740 or a ramp 1710 such that the deployed (i.e. spring-driven) pin 1730 enters the hole 1740 or wedges against the ramp 1710, preventing movement along (i.e. translation) or about (i.e. rotation) one or more axes.

A "jamming element" can be configured such that a frictional force or physical blocking prevents forward folding motion 1620 of one or more foldable propeller blades 1605, such as with, e.g., a ramp 1710, wedge, cam, pin, block, spring tab, etc.

A "magnet" can include one magnet or a system of magnets, can comprise any operative material, such as neodymium (i.e. NdFeB), alnico, ceramic, ferrite, as well as electromagnets.

Figure 16A:
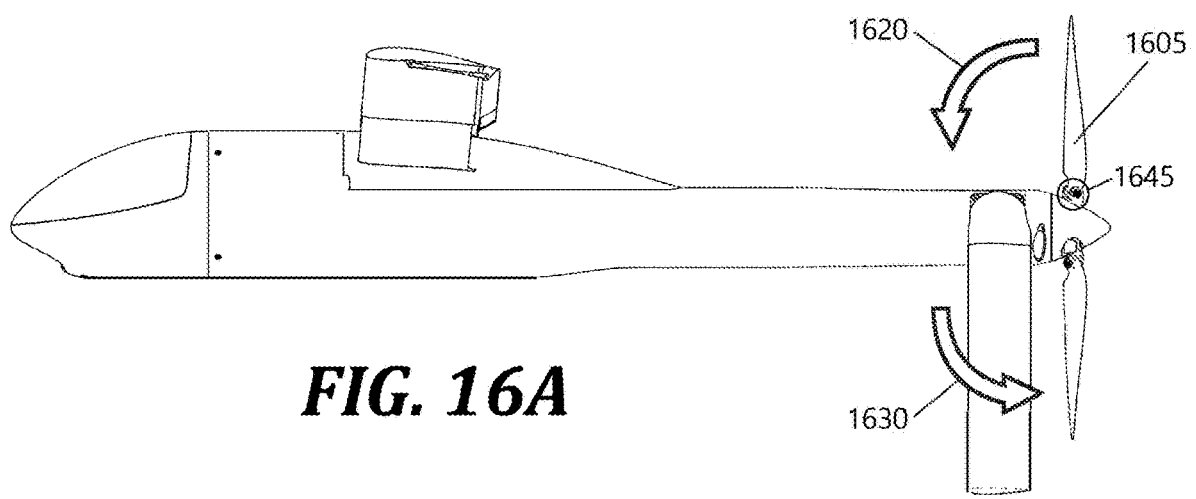
FIG. 16A illustrates an example of an UAVDC having a foldable propeller blade.

Referring now to FIG. 16A, there is illustrated an example of an aerial vehicle consistent with an embodiment. The aerial vehicle can have one or more foldable propeller blades 1605 that can rotate about a hinge 1610 (shown as part of a hinge assembly 1645), moving from a stowed configuration to a deployed configuration along the direction of hinge travel 1630. A foldable propeller blade 1605 can experience forces that could, in the absence of a locking mechanism 1615, tend to cause a forward folding motion 1620.

Figure 16B:
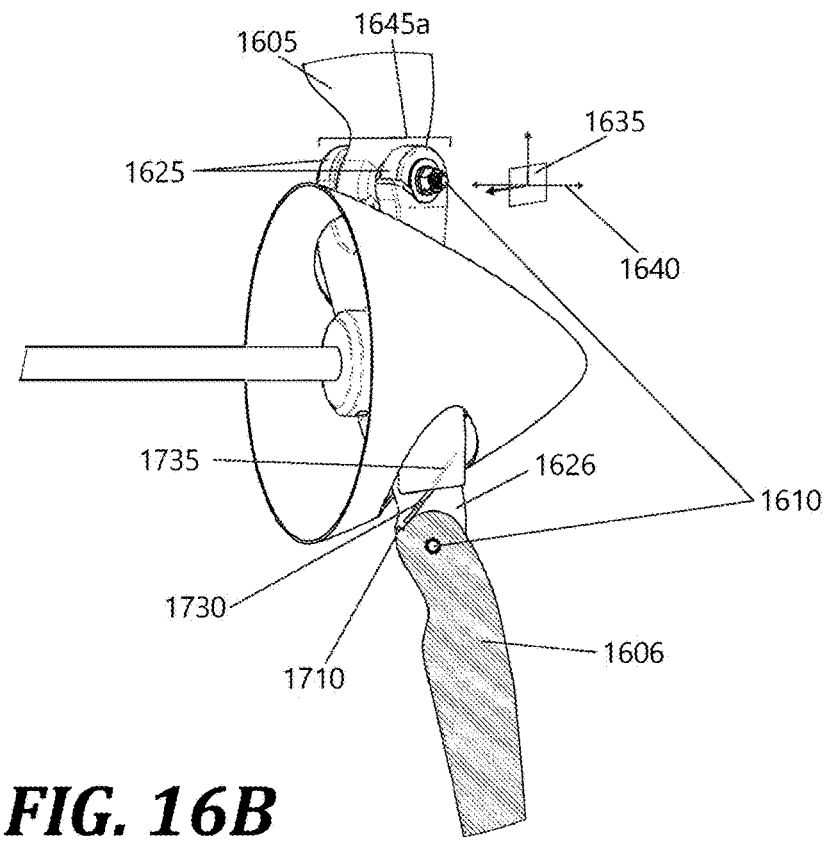
FIG. 16B illustrates an example of a propeller assembly with a locking mechanism.

Referring now to FIG. 16B, there is illustrated an example of a propeller assembly consistent with an embodiment. A foldable propeller blade 1605 can be connected by a hinge 1610 to a hub 1625 (which itself can be connected directly or indirectly to the fuselage 106). The through direction of the hinge 1610 in hinge assembly 1645*a* can be labeled as the axial direction 1640 (for the hinge assembly 1645*a* of that foldable propeller blade 1605), whereas the plane perpendicular can be labeled the radial plane 1635.

A sectional view 1606 of another example of a foldable propeller blade 1605 shows the hub interior 1626, as well as a locking mechanism 1615 comprising a spring-pin 1730 (with the spring 1735 partially recessed into the hub 1625) that can interact with a ramp 1710 to allow rotation to a deployed configuration and prevent forward folding motion 1620 back to a stowed configuration.

Referring now to FIG. 16C, there is illustrated another view of an example of a propeller assembly, consistent with an embodiment. Foldable propeller blades 1605 can deploy in the direction of hinge travel 1630, whereupon a locking mechanism 1615 can prevent forward folding motion 1620. The locking mechanism 1615 can operate between rotating surfaces—for example in hinge assembly 1645*c*, a spring 1735 can exert a force upon one side of the foldable propeller blade 1605 in the axial direction 1640, engaging ratchet 1720 (having a one-way interlocking tooth surface in the radial plane 1635) on the other side of the foldable propeller blade 1605. Note that hinge assembly 1645*b* may have its own axial and radial orientation, and may have a locking mechanism 1615 that is the same as or different from the locking mechanism 1615 of hinge assembly 1645*c*.

Referring now to FIG. 16D, there is illustrated another view of an example of a propeller assembly, consistent with an embodiment, which shows the direction of hinge travel 1630 and deployed configuration of one or more foldable propeller blades 1605, one or more of which can be locked in place by locking mechanism 1615.

Referring now to FIG. 17A, there is shown a conceptual illustration of an example of a locking mechanism 1615 with a tab 1715 and ramp 1710 configuration.

Referring now to FIG. 17B, there is shown a conceptual illustration of another example of a locking mechanism 1615 with a tab 1715 and ramp 1710 configuration. The direction of hinge travel 1630 depicted in FIG. 17B is opposite that of FIG. 17A, because the tab 1715 in FIG. 17B can act in the manner of a latch or hook against ramp 1710, whereas the tab 1715 in FIG. 17A can act in the manner of a jamming element.

Referring now to FIG. 17C, there is shown a conceptual illustration of an example of a locking mechanism 1615 with a ratchet 1720 and pawl 1725 configuration.

Referring now to FIG. 17D, there is shown a conceptual illustration of an example of a locking mechanism 1615 with a spring-pin 1730 and ramp 1710 configuration.

Figure 17E:
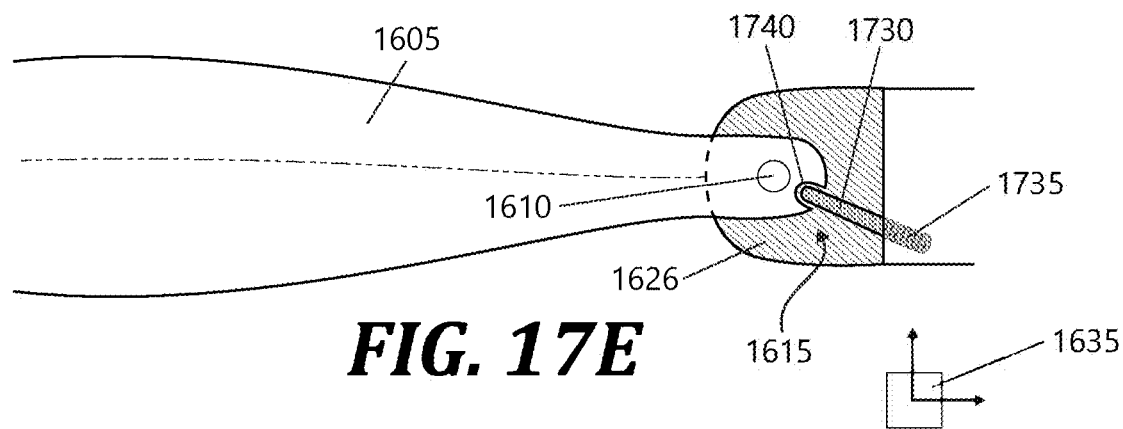
FIG. 17E illustrates an example of a locking mechanism with a spring-pin and hole configuration in the radial plane.

Referring now to FIG. 17E, there is shown a conceptual illustration of an example of a locking mechanism 1615 with a spring-pin 1730 and hole 1740 configuration.

Figure 17F:
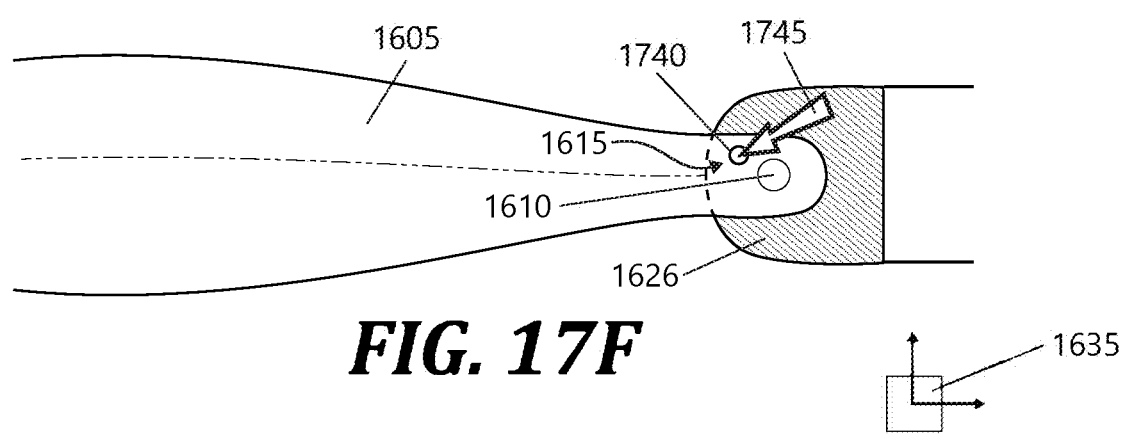
FIG. 17F illustrates an example of a locking mechanism with a spring-pin and hole configuration in the axial direction.

Referring now to FIG. 17F, there is shown a conceptual illustration of an example of a locking mechanism 1615 with a spring-pin 1730 and hole 1740 configuration. The spring-pin 1730 in FIG. 17F is not shown, as its direction of spring-pin insertion 1745 is out of plane (that is, acting in the axial direction 1640 and travelling through the radial plane 1635).

FIG. 17E depicts a spring-pin 1730 operating in the radial plane 1635.

Conversely, FIG. 17F depicts a spring-pin 1730 with the direction of spring-pin insertion 1745 operating in the axial direction 1640 (this can be through the foldable propeller blade 1605, and may align substantially with the through direction of the hinge 1610).

Embodiments can include or combine any of the features described herein. For example, in an embodiment with two foldable propeller blades 1605, the folding arrangement, interface between foldable propeller blade 1605 and fuselage 106, means for keeping the foldable propeller blade 1605 stowed, hinge assembly 1645, locking mechanism 1615, etc. can vary between the two foldable propeller blades 1605. The specific embodiments depicted in the drawings are not intended to limit the universe of combinations and configurations that may be present in other embodiments.

VI. ASPECTS

The following disclose various Aspects of the present disclosure. The various Aspects are not to be construed as patent claims unless the language of the Aspect appears as a patent claim. The Aspects describe various non-limiting embodiments of the present disclosure.

Aspect 1. At least one foldable propeller blade configured to an aerial vehicle in a pusher configuration comprising: a hinge that enables forward folding against a fuselage of the aerial vehicle in a volume-limited storage application; and a locking mechanism designed to prevent forward folding tendency resulting from thrust generated by the at least one foldable propeller blade.

Aspect 2. The at least one foldable propeller blade of Aspect 1, wherein the at least one foldable propeller blade experiences at least one force during a deployment of the aerial vehicle due to at least one of: a flow of one or more fluids; centrifugal force; one or more ramps; one or more spring mechanisms; one or more elastomeric components; and one or more actuators.

Aspect 3. The at least one foldable propeller blade of Aspect 1, wherein the locking mechanism further comprises at least one of: a ratchet and pawl; a ratchet and spring; a spring tab and ramp; a hook; a spring-loaded pin; a ball detent; two or more ramped surfaces in contact with each other; a radially ramped surface; an actuated pin; a jamming element; and a magnet.

Aspect 4. The at least one foldable propeller blade of Aspect 1, wherein the locking mechanism further comprises a coupling between the at least one foldable propeller blade to a hub.

Aspect 5. The at least one foldable propeller blade of Aspect 1, wherein the locking mechanism further comprises a coupling between the at least one foldable propeller blade and a shaft, and a coupling between the shaft and a hub.

Aspect 6. At least one foldable propellor blade configured to an aerial vehicle in a pusher configuration comprising: a first arrangement, wherein the at least one foldable propellor blade is configured against a fuselage of the aerial vehicle; a second arrangement, wherein the at least one foldable propellor is deployed in the pusher configuration; and a locking mechanism that enables the at least one foldable propellor blade to: transition of at least one foldable propellor blade from the first arrangement to the second arrangement, and counteract forward folding tendency resulting from thrust generated by the at least one foldable propeller blade.

Aspect 7. The at least one foldable propeller blade of Aspect 6, wherein the at least one foldable propeller blade experiences at least one force associated with a motion of the aerial vehicle due to at least one of: a flow of one or more fluids; centrifugal force; one or more ramps; one or more spring mechanisms; one or more elastomeric components; and one or more actuators.

Aspect 8. The at least one foldable propellor of Aspect 6, wherein the locking mechanism of the at least one foldable propellor blade is configured to force one-way travel of the foldable propellor blade.

Aspect 9. The at least one foldable propellor of Aspect 6, wherein the locking mechanism is disengaged in the first arrangement, enabling a transition of the at least one foldable propellor from the first arrangement to the second arrangement.

Aspect 10. The at least one foldable propellor of Aspect 6, wherein the locking mechanism engages to prevent any further motion at the second arrangement to enable the at least one foldable propellor.

Aspect 11. The at least one foldable propeller blade of Aspect 6, wherein the locking mechanism further comprises at least one of: a ratchet and pawl; a ratchet and spring; a spring tab and ramp; a hook; a spring-loaded pin; a ball detent; two or more ramped surfaces in contact with each other; a radially amped surface; an actuated pin; a jamming element; and a magnet.

VII. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. An aerial vehicle comprising:
   a fuselage;
   at least one propeller blade configured to transition between a folded position adjacent to the fuselage and a deployed position extending from the fuselage; and
   a locking mechanism operative to secure the at least one propeller blade in the deployed position to mitigate retraction forces during flight operations.

2. The aerial vehicle of claim 1, wherein the at least one propeller blade is subject to operational forces resulting from at least one of:
   environmental airflow interactions;
   rotational centrifugal activation;

mechanical transitions facilitated by ramp structures;
elastic potential energy from spring elements;
deformation resistance offered by elastomeric materials; and
mechanical actuation for deployment.

3. The aerial vehicle of claim 1, wherein the locking mechanism is structured to permit unidirectional movement of the at least one propeller blade from the folded position to the deployed position.

4. The aerial vehicle of claim 1, wherein the locking mechanism is inactive in the folded position to allow unfettered deployment of the at least one propeller blade.

5. The aerial vehicle of claim 1, wherein upon deployment, the locking mechanism activates to preclude any backward movement towards the folded position of the at least one propeller blade.

6. The aerial vehicle of claim 1, wherein the locking mechanism is characterized by comprising elements from the group consisting of:
a ratchet interfacing with a pawl for directional locking;
a spring-assisted ratchet for controlled deployment;
an engagement ramp met by a spring-actuated tab for positional locking;
a mechanical hook for secure locking;
a spring-propelled pin for positional engagement;
a ball and detent arrangement for secure locking;
interfacing ramped surfaces for mechanical engagement;
radially designed surfaces for locking interaction;
an actuator-driven pin for secure positioning;
a component designed to jam against movement for locking; and
magnetic components for secure locking engagement.

7. An unmanned aerial vehicle comprising:
a fuselage;
at least one foldable propeller blade pivotally connected to the fuselage and movable between a stowed position proximate to the fuselage and a deployed position extending away from the fuselage to generate propulsion in a pusher configuration; and
a locking mechanism operatively coupled to the at least one foldable propeller blade to restrict movement towards the stowed position when in the deployed position due to aerodynamic forces encountered during flight.

8. The unmanned aerial vehicle of claim 7, wherein the at least one foldable propeller blade is configured to unfold in response to at least one of aerodynamic forces, mechanical actuation, or centrifugal forces when transitioning from the stowed position to the deployed position.

9. The unmanned aerial vehicle of claim 7, wherein the locking mechanism comprises a mechanical interlock feature that engages automatically when the at least one foldable propeller blade reaches the deployed position.

10. The unmanned aerial vehicle of claim 7, wherein the locking mechanism includes a manually actuated release mechanism for folding the at least one foldable propeller blade from the deployed position back to the stowed position.

11. The unmanned aerial vehicle of claim 7, wherein the locking mechanism is integral to a hinge assembly that pivotally connects the at least one foldable propeller blade to the fuselage.

12. The unmanned aerial vehicle of claim 7, further comprising a controller configured to control the movement of the at least one foldable propeller blade between the stowed position and the deployed position.

13. The unmanned aerial vehicle of claim 7, wherein the at least one foldable propeller blade comprises a plurality of blades, each blade being independently movable between the stowed position and the deployed position.

14. The unmanned aerial vehicle of claim 7, wherein the locking mechanism further comprises a biasing member that urges the at least one foldable propeller blade towards the deployed position.

15. The unmanned aerial vehicle of claim 7, wherein the locking mechanism is configured to engage and disengage based on the rotational speed of the at least one foldable propeller blade.

16. The unmanned aerial vehicle of claim 7, further comprising a sensor configured to detect the position of the at least one foldable propeller blade and provide feedback to a control system for maintaining the deployed position during flight.

17. The unmanned aerial vehicle of claim 7, wherein the at least one foldable propeller blade is configured to deploy from the stowed position to the deployed position using at least one selected from a group consisting of: a linear actuator, a rotary actuator, and a shape memory alloy actuator.

18. An unmanned aerial vehicle comprising:
a fuselage;
at least one foldable propellor blade pivotally connected to the fuselage and configured to transition between a stowed configuration and a deployed configuration for propulsion;
a hinge mechanism facilitating the pivotal connection of the at least one foldable propellor blade to the fuselage; and
a locking mechanism operatively associated with the at least one foldable propellor blade to maintain the at least one foldable propellor blade in the deployed configuration against forces tending to fold the blade forward towards the fuselage.

19. The unmanned aerial vehicle of claim 18, wherein the at least one foldable propellor blade is subjected to aerodynamic forces during flight operations, the locking mechanism configured to resist said forces to prevent involuntary folding of the at least one foldable propellor blade.

20. The unmanned aerial vehicle of claim 18, wherein the locking mechanism comprises a mechanical interlock engaging when the at least one foldable propellor blade is in the deployed configuration.

* * * * *